(12) United States Patent
Uno et al.

(10) Patent No.: US 12,463,590 B2
(45) Date of Patent: Nov. 4, 2025

(54) OSCILLATOR AND METHOD OF MANUFACTURING FIRST OSCILLATOR AND SECOND OSCILLATOR

(71) Applicant: SEIKO EPSON CORPORATION, Tokyo (JP)

(72) Inventors: Tomohiro Uno, Chino (JP); Yasuhiro Sudo, Chino (JP); Kentaro Seo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/646,093

(22) Filed: Apr. 25, 2024

(65) Prior Publication Data

US 2024/0364262 A1 Oct. 31, 2024

(30) Foreign Application Priority Data

Apr. 27, 2023 (JP) ................ 2023-073118

(51) Int. Cl.
| | |
|---|---|
| *H03B 5/04* | (2006.01) |
| *G06N 3/04* | (2023.01) |
| *G06N 3/08* | (2023.01) |
| *H03B 5/32* | (2006.01) |
| *H03B 5/36* | (2006.01) |

(52) U.S. Cl.
CPC ............. *H03B 5/04* (2013.01); *G06N 3/04* (2013.01); *G06N 3/08* (2013.01); *H03B 5/32* (2013.01); *H03B 5/36* (2013.01)

(58) Field of Classification Search
CPC ... H03B 5/04; H03B 5/36; H03B 5/32; H03H 9/19; H03H 9/08; G06N 3/04; G06N 3/08
USPC .................... 331/158, 167, 176, 116 FE
See application file for complete search history.

(56) References Cited

U.S. PATENT DOCUMENTS

| | | | |
|---|---|---|---|
| 7,342,460 B2* | 3/2008 | Batchelor | ............... H03L 7/101 331/10 |
| 2015/0061783 A1 | 3/2015 | Yorita | |
| 2015/0142715 A1* | 5/2015 | Esterline | .................. G06N 3/02 706/23 |
| 2016/0013771 A1* | 1/2016 | Sridaran | .................. H03H 3/02 219/209 |

FOREIGN PATENT DOCUMENTS

JP 2015-46704 A 3/2015

* cited by examiner

*Primary Examiner* — Arnold M Kinkead
(74) *Attorney, Agent, or Firm* — Rankin, Hill & Clark LLP

(57) ABSTRACT

An oscillator includes a resonator element, a temperature control element that controls a temperature of the resonator element, a microcontroller that stores a temperature control program and controls an operation of the temperature control element based on the temperature control program, and an interface circuit, in which the temperature control program is rewritable via the interface circuit.

12 Claims, 16 Drawing Sheets

OSCILLATOR AND METHOD OF MANUFACTURING FIRST OSCILLATOR AND SECOND OSCILLATOR

The present application is based on, and claims priority from JP Application Serial Number 2023-073118, filed Apr. 27, 2023, the disclosure of which is hereby incorporated by reference herein in its entirety.

BACKGROUND

1. Technical Field

The present disclosure relates to an oscillator and a method of manufacturing a first oscillator and a second oscillator.

2. Related Art

JP-A-2015-046704 discloses an OCXO, which is a quartz crystal oscillator, in which a heating section for oscillation circuit to make a temperature of an atmosphere placed with an oscillation circuit constant is provided, in addition to a heating section for resonator to make a temperature of an atmosphere placed with a quartz crystal resonator constant, and the heating section for oscillation circuit is controlled independently from the heating section for resonator to be able to obtain an oscillation output having high frequency stability. In the OCXO described in JP-A-2015-046704, heat generation bodies are respectively provided inside and outside an IC including the oscillation circuit, and which of the heating bodies is used as the heating section for oscillation circuit can be selected by rewriting a parameter in a register of a control circuit from an external computer. Further, with a data change of the register, an output frequency setting or the like can be changed.

In the OCXO described in JP-A-2015-046704, the parameter in the register can be rewritten for design optimization. However, since a function of the OCXO is advanced and complicated, setting switching as in the OCXO described in JP-A-2015-046704 is insufficient. For example, depending on the use of OCXO or the like, a more advanced functional change such as a change of calculation for oven temperature control is required.

SUMMARY

According to an aspect of the present disclosure, there is provided an oscillator including
a resonator element,
a temperature control element that controls a temperature of the resonator element,
a microcontroller that stores a temperature control program and controls an operation of the temperature control element based on the temperature control program, and
an interface circuit, in which
the temperature control program is rewritable via the interface circuit.

According to an aspect of the present disclosure, there is provided a method of manufacturing a first oscillator and a second oscillator, in which
the first oscillator includes a first resonator element, a first temperature control element that controls a temperature of the first resonator element, a first microcontroller, and a first interface circuit, and
the second oscillator includes a second resonator element, a second temperature control element that controls a temperature of the second resonator element, a second microcontroller, and a second interface circuit, the method including
causing the first microcontroller to store a first temperature control program for controlling an operation of the first temperature control element via the first interface circuit, and
causing the second microcontroller to store a second temperature control program, which is different from the first temperature control program, for controlling an operation of the second temperature control element via the second interface circuit.

DESCRIPTION OF EMBODIMENTS

Hereinafter, appropriate embodiments of the present disclosure will be described in detail with reference to the drawings. In addition, the embodiments which will be described below do not inappropriately limit the contents of the present disclosure described in the claims. Further, not all of the configurations which will be described below are necessarily essential components of the present disclosure.

1. Oscillator 1-1. Structure of Oscillator

Figure 1:
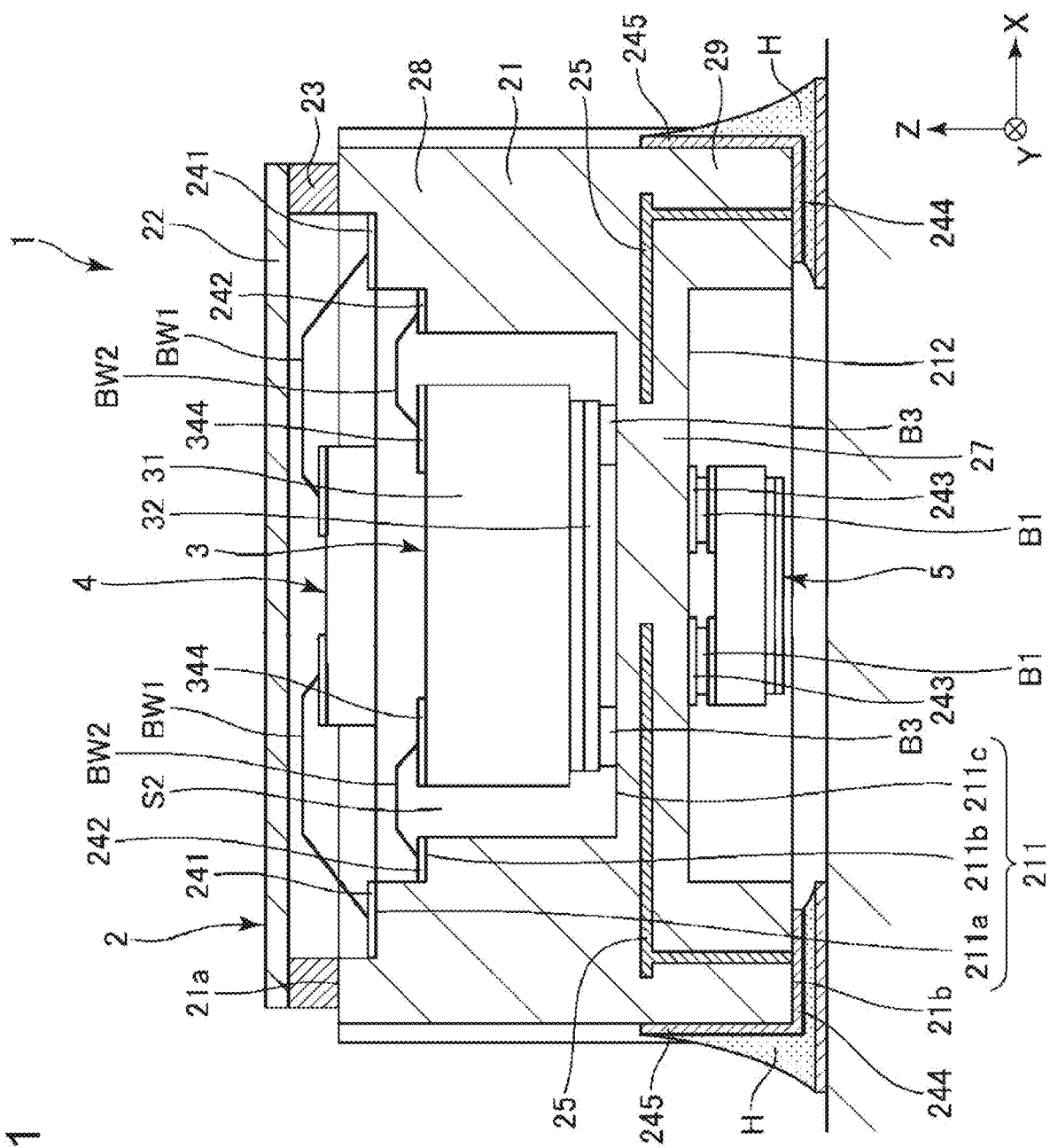
FIG. 1 is a cross-sectional view of an oscillator according to the present embodiment.
Figure 2:
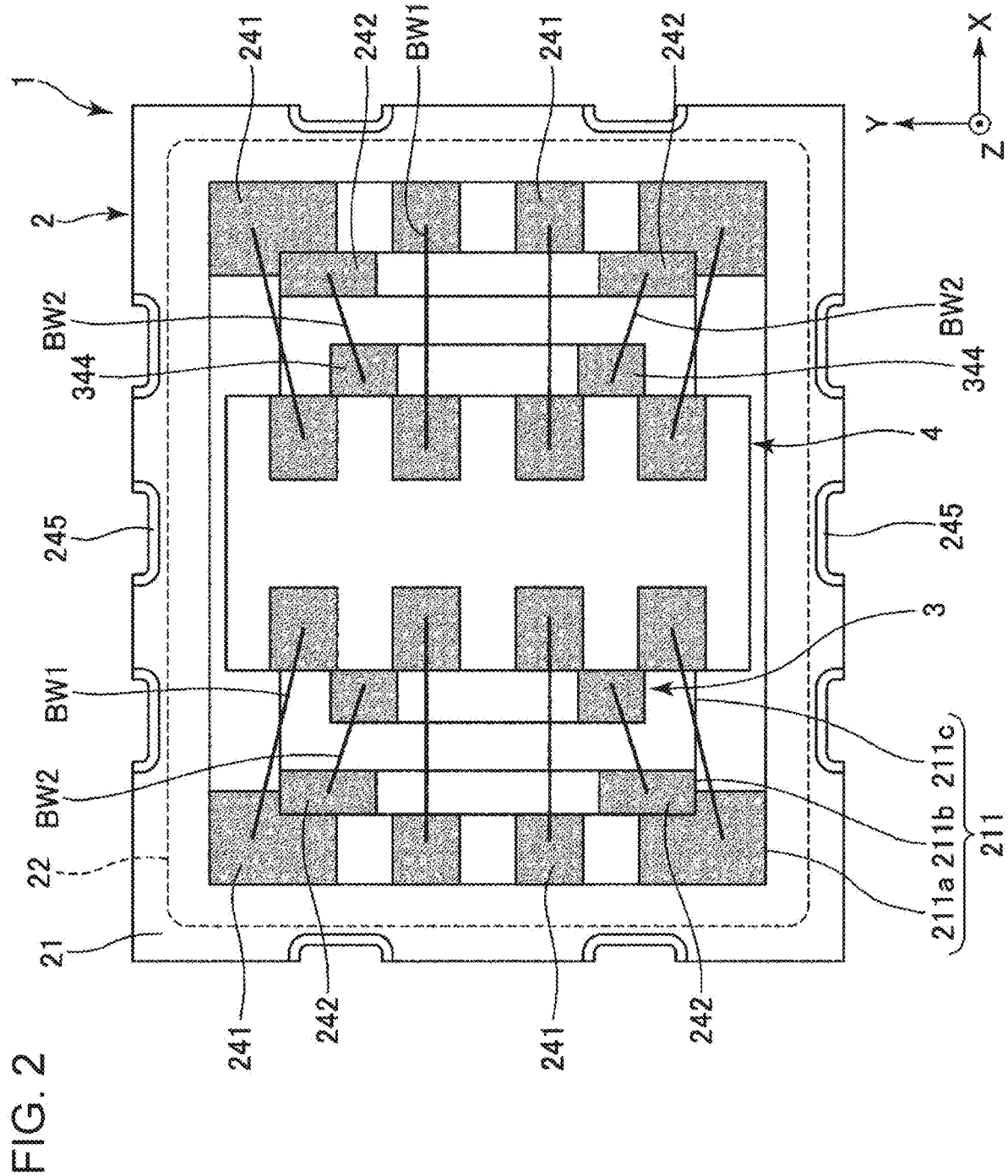
FIG. 2 is a plan view of the oscillator according to the present embodiment.
Figure 3:
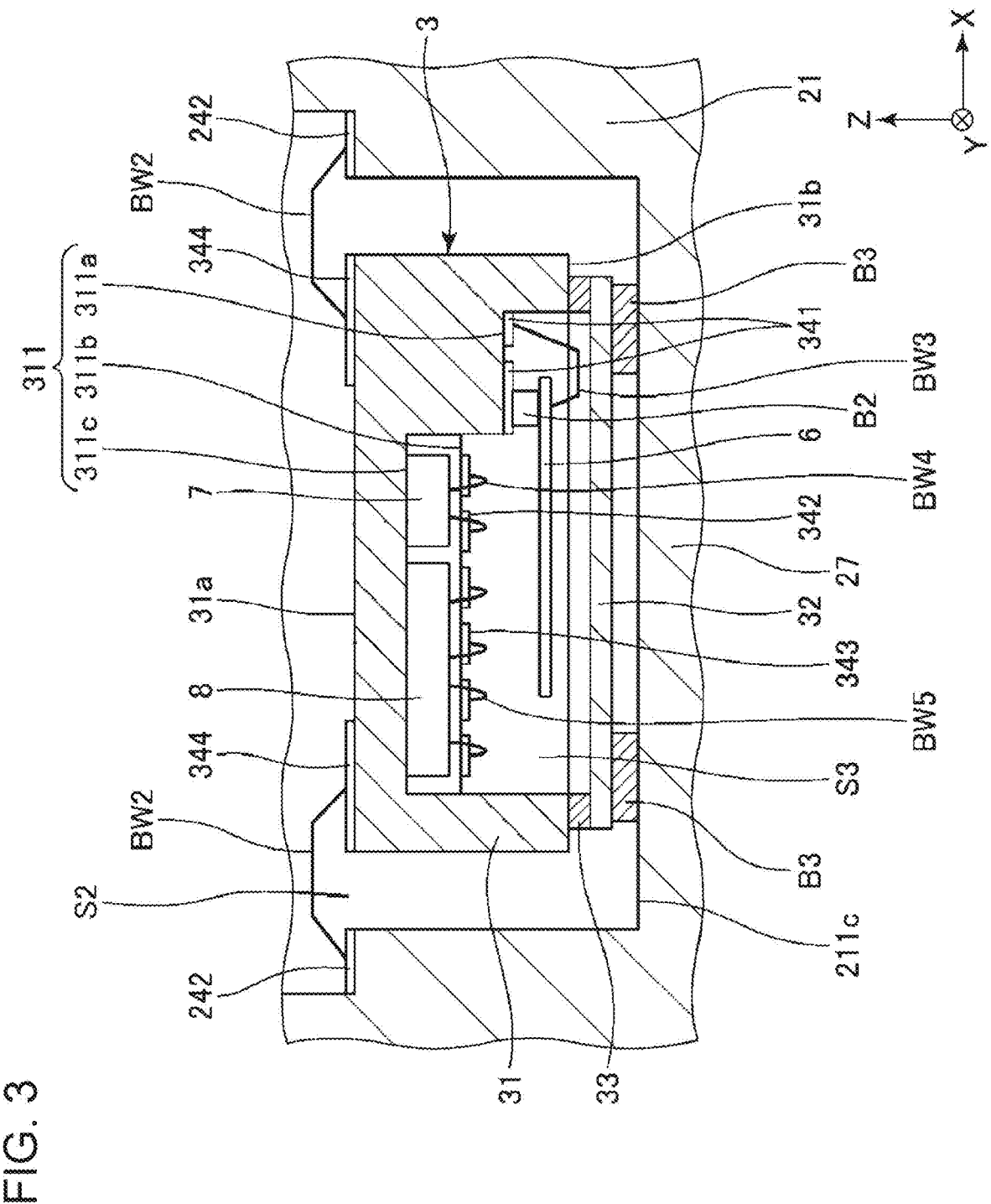
FIG. 3 is a cross-sectional view of an inner-side package included in the oscillator and an inside of the inner-side package.
Figure 4:
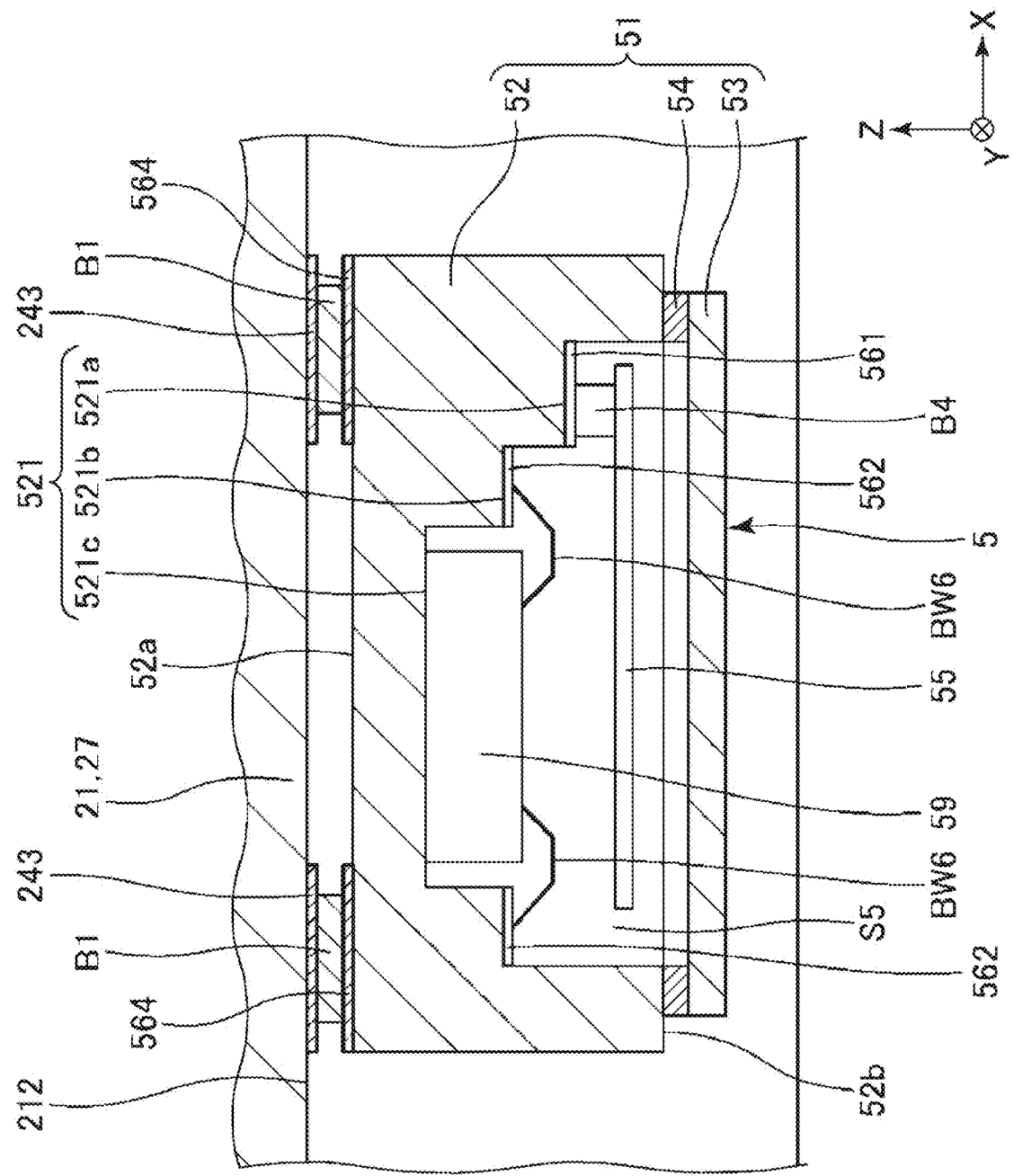
FIG. 4 is a cross-sectional view of a voltage controlled oscillator included in the oscillator.

FIG. 1 is a cross-sectional view of an oscillator according to the present embodiment. FIG. 2 is a plan view in which an oscillator is viewed from an upper surface side. FIG. 3 is a cross-sectional view of an inner-side package included in the oscillator and an inside of the inner-side package. FIG. 4 is a cross-sectional view of a voltage controlled oscillator included in the oscillator.

An oscillator 1 shown in FIGS. 1 and 2 is a constant temperature bath type quartz crystal oscillator, and includes an outer-side package 2, an inner-side package 3, a control IC 4, and a voltage controlled oscillator 5. The inner-side package 3, the control IC 4, and the voltage controlled oscillator 5 are accommodated in the outer-side package 2.

As shown in FIG. 1, the outer-side package 2 has an outer-side base 21 and an outer-side lid 22. The outer-side base 21 has a substrate 27, a frame-shaped wall portion 28 erected upward from an edge portion of an upper surface of the substrate 27, and a frame-shaped leg portion 29 erected downward from an edge portion of a lower surface of the substrate 27. The upper surface of the substrate 27 and the wall portion 28 form an upper-side recess portion 211 that opens to an upper surface 21a of the outer-side base 21, and the lower surface of the substrate 27 and the leg portion 29 form a lower-side recess portion 212 that opens to a lower surface 21b of the outer-side base 21. Therefore, the outer-side base 21 has a substantial H type in a cross-sectional view.

The upper-side recess portion 211 has a first upper-side recess portion 211a that opens to the upper surface 21a, a second upper-side recess portion 211b that opens to a bottom surface of the first upper-side recess portion 211a and has a smaller opening than that of the first upper-side recess portion 211a, and a third upper-side recess portion 211c that opens to a bottom surface of the second upper-side recess portion 211b and has a smaller opening than that of the second upper-side recess portion 211b. A control IC 4 is disposed on the bottom surface of the first upper-side recess portion 211a, and the inner-side package 3 is disposed on a bottom surface of the third upper-side recess portion 211c.

The outer-side lid 22 is bonded to the upper surface 21a of the outer-side base 21 via a sealing member 23, such as a seal ring or low melting point glass, in a manner to close an opening of the upper-side recess portion 211. Accordingly, the upper-side recess portion 211 is airtightly sealed, and an outer-side accommodation space S2 as an accommodation space is formed in the outer-side package 2. On the other hand, an opening of the lower-side recess portion 212 is not sealed and faces an outside of the outer-side package 2. The inner-side package 3 and the control IC 4 are accommodated in the outer-side accommodation space S2, and the voltage controlled oscillator 5 is disposed in the lower-side recess portion 212.

The outer-side base 21 is disposed with a plurality of internal terminals 241 disposed on the bottom surface of the first upper-side recess portion 211a, a plurality of internal terminals 242 disposed on the bottom surface of the second upper-side recess portion 211b, a plurality of internal terminals 243 disposed on the bottom surface of a bottom surface of the lower-side recess portion 212, and a plurality of external terminals 244 disposed on the lower surface 21b, that is, a top surface of the leg portion 29. Each internal terminal 241 is electrically coupled to the control IC 4 via a bonding wire BW1, each internal terminal 242 is electrically coupled to the inner-side package 3 via a bonding wire BW2, and each internal terminal 243 is electrically coupled to the voltage controlled oscillator 5 via a conductive bonding member B1.

Each of these terminals 241, 242, 243, and 244 is electrically coupled as appropriate via an internal wiring 25 formed in the outer-side base 21 to electrically couple the control IC 4, the inner-side package 3, the voltage controlled oscillator 5, and the external terminal 244. The internal wiring 25 is coupled to the external terminal 244 through the inside of the leg portion 29. The external terminal 244 is coupled to an external device (not illustrated). A side surface terminal 245 coupled to the external terminal 244 is disposed on a side surface of the leg portion 29. The side surface terminal 245 is a castellation. Therefore, a solder H wets and spreads on the side surface terminal 245 to form a fillet, which makes mechanical and electrical coupling to the external device stronger. However, the present disclosure is not limited thereto, and for example, the side surface terminal 245 may be omitted.

As shown in FIG. 3, the inner-side package 3 has an inner-side base 31 and an inner-side lid 32. The inner-side base 31 has a recess portion 311 that opens to a lower surface 31b.

The recess portion 311 has a first recess portion 311a that opens to the lower surface 31b, a second recess portion 311b that opens to a bottom surface of the first recess portion 311a and has a smaller opening than that of the first recess portion 311a, and a third recess portion 311c that opens to a bottom surface of the second recess portion 311b and has a smaller opening than that of the second recess portion 311b. A resonator element 6 is disposed on the bottom surface of the first recess portion 311a, and a heat generation IC 7 and an oscillation IC 8 are disposed side by side in an X-axis direction on a bottom surface of the third recess portion 311c.

The inner-side lid 32 is bonded to the lower surface 31b of the inner-side base 31 via a sealing member 33, such as a seal ring or low melting point glass, in a manner to close an opening of the recess portion 311. Accordingly, the recess portion 311 is airtightly sealed, and an inner-side accommodation space S3 is formed in the inner-side package 3. The resonator element 6, the heat generation IC 7, and the oscillation IC 8 are accommodated in the inner-side accommodation space S3.

Such an inner-side accommodation space S3 is airtight, and is in a decompressed state, preferably in a state closer to a vacuum. Accordingly, viscous resistance of the inner-side accommodation space S3 is reduced, and vibration characteristics of the resonator element 6 are improved. However, an atmosphere of the inner-side accommodation space S3 is not particularly limited.

The inner-side base 31 is disposed with a plurality of internal terminals 341 disposed on the bottom surface of the first recess portion 311a, a plurality of internal terminals 342 and 343 disposed on the bottom surface of the second recess portion 311b, and a plurality of external terminals 344 disposed on an upper surface 31a of the inner-side base 31. Each internal terminal 341 is electrically coupled to the resonator element 6 via a conductive bonding member B2 and a bonding wire BW3, each internal terminal 342 is electrically coupled to the heat generation IC 7 via a bonding wire BW4, and each internal terminal 343 is electrically coupled to the oscillation IC 8 via a bonding wire BW5.

Each of these terminals 341, 342, 343, and 344 is electrically coupled as appropriate via an internal wiring (not illustrated) formed in the inner-side package 3 to electrically couple the resonator element 6, the heat generation IC 7, the oscillation IC 8, and the external terminal 344. In such an inner-side package 3, the inside and the outside of the inner-side package 3 are electrically coupled to each other via the external terminal 344.

The inner-side package 3 as described above is fixed to the bottom surface of the third upper-side recess portion 211c in the inner-side lid 32 via a bonding member B3 having a sufficiently low thermal conductivity.

As shown in FIG. 3, the heat generation IC 7 is disposed on the bottom surface of the third recess portion 311c with an active surface facing downward (inner-side lid 32 side), and is electrically coupled to the plurality of internal terminals 342 via the bonding wire BW4. The oscillation IC 8 is disposed on the bottom surface of the third recess portion 311c with an active surface facing downward (inner-side lid 32 side), and is electrically coupled to the plurality of internal terminals 343 via the bonding wire BW5.

The voltage controlled oscillator 5 is an oscillator that outputs an oscillation signal whose frequency changes according to an input voltage. As shown in FIG. 4, the voltage controlled oscillator 5 has a package 51, and a resonator element 55 and an oscillation IC 59 accommodated in the package 51.

The package 51 has a base 52 and a lid 53. The base 52 has a recess portion 521 that opens to a lower surface 52b. The recess portion 521 has a first recess portion 521a that opens to the lower surface 52b, a second recess portion 521b that opens to a bottom surface of the first recess portion 521a and has a smaller opening than that of the first recess portion 521a, and a third recess portion 521c that opens to a bottom surface of the second recess portion 521b and has a smaller opening than that of the second recess portion 521b. The resonator element 55 is disposed on the bottom surface of the first recess portion 521a, and the oscillation IC 59 is disposed on a bottom surface of the third recess portion 521c.

The lid 53 is bonded to the lower surface 52b of the base 52 via a sealing member 54, such as a seal ring or low melting point glass, in a manner to close an opening of the recess portion 521. Accordingly, the recess portion 521 is airtightly sealed, and an accommodation space S5 is formed in the package 51. The resonator element 55 and the oscillation IC 59 are accommodated in the accommodation space S5. The accommodation space S5 is airtight, and is in a decompressed state, preferably in a state closer to a vacuum. Accordingly, the viscous resistance of the accommodation space S5 is reduced, and the vibration characteristics of the resonator element 55 are improved. However, an atmosphere of the accommodation space S5 is not particularly limited.

The base 52 is disposed with a plurality of internal terminals 561 disposed on the bottom surface of the first recess portion 521a, a plurality of internal terminals 562 disposed on the bottom surface of the second recess portion 521b, and a plurality of external terminals 564 disposed on an upper surface 52a of the base 52. Each internal terminal 561 is electrically coupled to the resonator element 55 via a conductive bonding member B4, and each internal terminal 562 is electrically coupled to the oscillation IC 59 via a bonding wire BW6. Each of these terminals 561, 562, and 564 is electrically coupled as appropriate via an internal wiring (not illustrated) formed in the base 52 to electrically couple the resonator element 55, the oscillation IC 59, and the external terminal 564. In such a package 51, the inside and the outside of the package 51 are electrically coupled to each other via the external terminal 564.

The resonator element 55 is an AT cut quartz crystal resonator element. However, the resonator element 55 may not have to be the AT cut quartz crystal resonator element, and may be, for example, an SC cut quartz crystal resonator element, a BT cut quartz crystal resonator element, a tuning fork type quartz crystal resonator element, a surface acoustic wave resonator, another piezoelectric resonator element, or a MEMS resonance element.

The oscillation IC 59 is disposed on the bottom surface of the third recess portion 521c with an active surface facing downward, and is electrically coupled to the plurality of internal terminals 562 via the bonding wire BW6.

As shown in FIG. 4, the voltage controlled oscillator 5 is fixed to the bottom surface of the lower-side recess portion 212 via the conductive bonding member B1. Further, the external terminal 564 and the internal terminal 243 are electrically coupled to each other via the bonding member B1.

1-2. Functional Configuration of Oscillator

Figure 5:
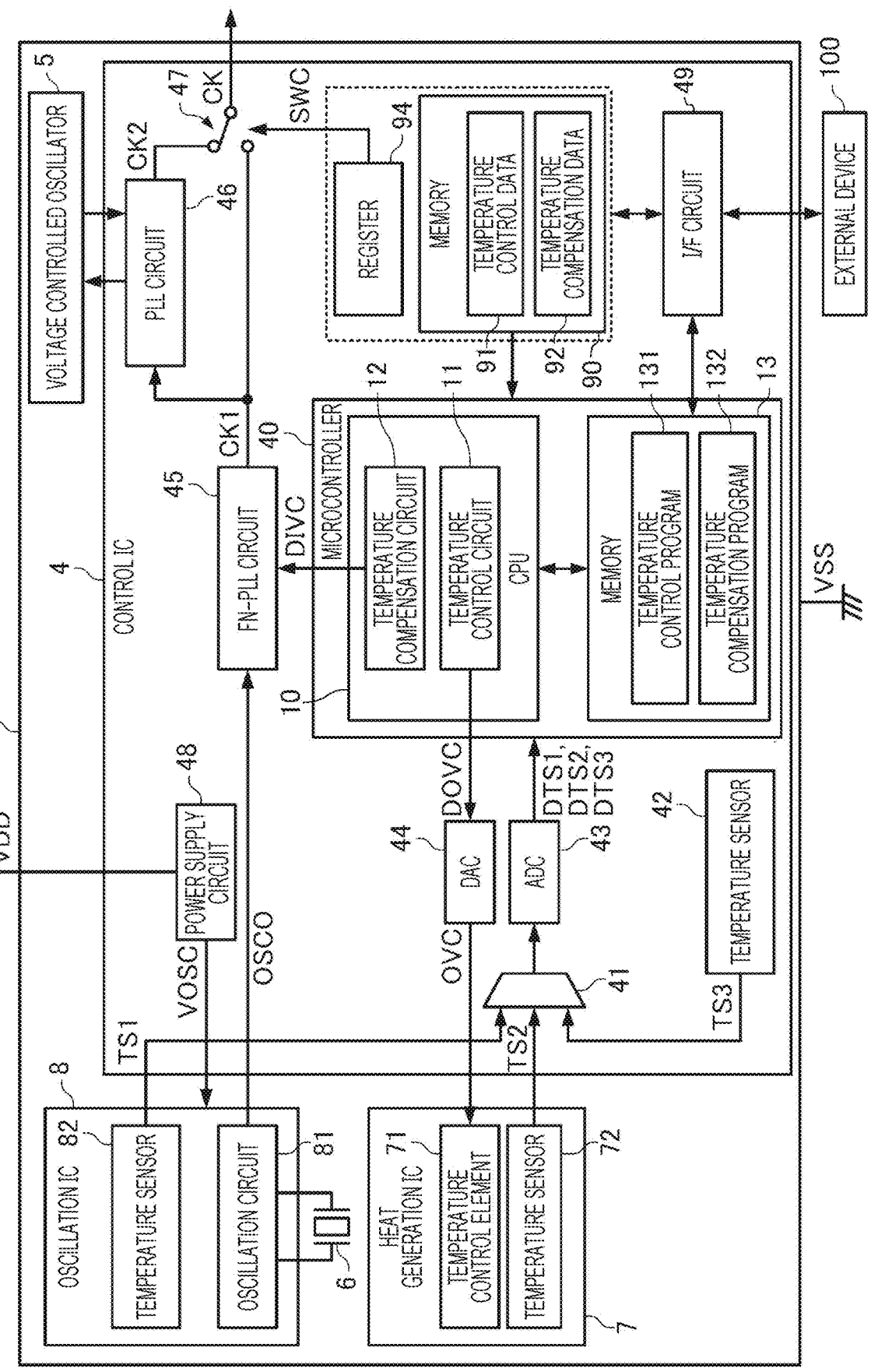
FIG. 5 is a functional block diagram of the oscillator according to the present embodiment.

FIG. 5 is a functional block diagram of the oscillator 1 according to the present embodiment. In FIG. 5, the same reference numerals are assigned to the same components as those shown in FIGS. 1 to 4. As shown in FIG. 5, the oscillator 1 according to the present embodiment includes the control IC 4, the voltage controlled oscillator 5, the resonator element 6, the heat generation IC 7, and the oscillation IC 8.

The oscillation IC 8 includes an oscillation circuit 81 and a temperature sensor 82, and operates with a power supply voltage VOSC supplied from the control IC 4. The oscillation circuit 81 is electrically coupled to both ends of the resonator element 6, and is a circuit that causes the resonator element 6 to oscillate by amplifying an output signal of the resonator element 6 and feeding back the output signal to the resonator element 6 to output an oscillation signal OSCO. For example, the oscillation circuit 81 may be an oscillation circuit using an inverter as an amplification element, or may be an oscillation circuit using a bipolar transistor as the amplification element. The oscillation signal OSCO output from the oscillation circuit 81 is input to the control IC 4.

The temperature sensor 82 is a thermosensitive element that measures a temperature and outputs a temperature measurement signal TS1 having a voltage level corresponding to the measured temperature. The temperature sensor 82 is built in the oscillation IC 8 and measures the temperature of the oscillation IC 8. The temperature measurement signal TS1 output from the temperature sensor 82 is input to the control IC 4. The temperature sensor 82 may be, for example, a sensor that uses the temperature dependency of a forward voltage of a PN junction of a diode.

The heat generation IC 7 includes a temperature control element 71 and a temperature sensor 72. The temperature control element 71 is an element that controls the temperature of the resonator element 6 based on a temperature control signal OVC output from the control IC 4, and may be a heat generation element. For example, the temperature control element 71 is a CMOS transistor, and a heat generation amount of the temperature control element 71 changes according to a voltage of the temperature control signal OVC input to a gate. The temperature of the resonator element 6 increases as the heat generation amount of the temperature control element 71 becomes larger, and the control IC 4 controls the heat generation amount of the temperature control element 71 such that the temperature of the resonator element 6 is constant at a target set temperature. For example, the set temperature may be a fixed value such as 80° C., or may be randomly settable within a predetermined range such as a range of 70° C. or higher and 125° C.

The temperature sensor 72 is a thermosensitive element that measures a temperature and outputs a temperature measurement signal TS2 having a voltage level corresponding to the measured temperature. The temperature sensor 72 is built in the heat generation IC 7 and measures the temperature of the heat generation IC 7. Since the temperature control element 71 is also built in the heat generation IC 7, the temperature sensor 72 measures the temperature of the temperature control element 71. The temperature measurement signal TS2 output from the temperature sensor 72 is input to the control IC 4. The temperature sensor 72 may be, for example, a sensor that uses the temperature dependency of a forward voltage of a PN junction of a diode.

As shown in FIG. 3, the resonator element 6, the heat generation IC 7, and the oscillation IC 8 are accommodated in the inner-side package 3, and the control IC 4 controls the heat generation of the heat generation IC 7 such that the temperature of the resonator element 6 is kept constant. The heat generation IC 7 is a heat generation source, and radiant heat from the heat generation IC 7 is transferred to the resonator element 6 or the oscillation IC 8. Thus, a difference is generated between the temperature of the resonator element 6 or the oscillation IC 8 and the temperature of the heat generation IC 7. On the contrary, assuming that the resonator element 6 and the oscillation IC 8 are disposed apart from the heat generation IC 7 and a thermal distance between the heat generation IC 7 and the resonator element 6 is substantially the same as a thermal distance between the heat generation IC 7 and the oscillation IC 8, it can be said that the temperature of the oscillation IC 8 is close to the temperature of the resonator element 6. That is, the temperature measured by the temperature sensor 82 built in the oscillation IC 8 is closer to the temperature of the resonator element 6 than the temperature measured by the temperature sensor 72 built in the heat generation IC 7. Therefore, as will be described below, the control IC 4 controls the heat generation of the heat generation IC 7 based on the temperature measurement signal TS1 output from the temperature sensor 82. However, depending on the disposition of the resonator element 6, the heat generation IC 7, and the oscillation IC 8, the temperature of the heat generation IC 7 may be closer to the temperature of the resonator element 6 than the temperature of the oscillation IC 8. In that case, the control IC 4 may control the heat generation of the heat generation IC 7 based on the temperature measurement signal TS2 output from the temperature sensor 72.

The temperature sensor 82 or the temperature sensor 72 is an example of "first temperature sensor", and the temperature sensor 42 is an example of "second temperature sensor".

The control IC 4 includes a microcontroller 40, a selector 41, a temperature sensor 42, an A/D converter 43, a D/A converter 44, a fractional N-PLL circuit 45, a PLL circuit 46, a switch circuit 47, a power supply circuit 48, an interface circuit 49, a memory 90, and a register 94. PLL is an abbreviation for phase locked loop.

The power supply circuit 48 generates, based on a power supply voltage VDD supplied from the outside of the oscillator 1 and a ground voltage VSS, the power supply voltage VOSC, which is a constant voltage lower than the power supply voltage VDD. For example, the power supply circuit 48 generates the power supply voltage VOSC, which is a constant voltage, based on an output voltage of a band gap reference circuit. The power supply voltage VOSC is supplied to the oscillation IC 8.

The fractional N-PLL circuit 45 receives the oscillation signal OSCO output from the oscillation IC 8 and outputs a clock signal CK1 obtained by converting a frequency $f_{OSCO}$ of the oscillation signal OSCO into a frequency $f_{CK1}$ corresponding to a division ratio instructed by a division ratio control signal DIVC. The fractional N-PLL circuit 45 generates the clock signal CK1 by performing feedback control such that a phase of the oscillation signal OSCO matches a phase of a signal obtained by dividing the clock signal CK1 at the division ratio designated by the division ratio control signal DIVC. The division ratio control signal DIVC is subjected to delta sigma modulation, and the division ratio designated by the division ratio control signal DIVC is switched between a plurality of integer division ratios and becomes a fractional division ratio when averaging is performed. Therefore, the frequency $f_{CK1}$ is a non-integral multiple of the frequency $f_{OSCO}$. The fractional N-PLL circuit 45 may output the clock signal CK1 having the frequency $f_{CK1}$, which is different from the frequency $f_{OSCO}$ and is substantially constant regardless of an outside air temperature, according to the division ratio control signal DIVC.

The PLL circuit 46 receives the clock signal CK1 output from the fractional N-PLL circuit 45 and outputs a clock signal CK2 having a frequency $f_{CK2}$, which is the same frequency as the frequency $f_{CK1}$ of the clock signal CK1. The PLL circuit 46 generates the clock signal CK2 by performing feedback control of an input voltage of the voltage controlled oscillator 5 such that a phase of the clock signal CK1 matches a phase of the clock signal CK2 output from the voltage controlled oscillator 5.

The frequency $f_{CK1}$ of the clock signal CK1 output from the fractional N-PLL circuit 45 is a non-integral multiple of the frequency $f_{OSCO}$ of the oscillation signal OSCO, and the clock signal CK1 has large jitter. On the contrary, the frequency $f_{CK2}$ of the clock signal CK2 output from the PLL circuit 46 is the same as the frequency $f_{CK1}$ of the clock signal CK1, and the clock signal CK2 is output from the voltage controlled oscillator 5 using the resonator element 55 having high frequency stability. Thus, the clock signal CK2 has smaller jitter than the clock signal CK1.

The switch circuit 47 outputs a clock signal CK selected from any one of the clock signal CK1 or the clock signal CK2, according to a logic level of a switch control signal SWC output from the register 94. The clock signal CK is output to the outside of the oscillator 1. The clock signal CK may be supplied to an external device 100 or may be supplied to a device different from the external device 100. For example, the clock signal CK2 having small jitter may be selected as the clock signal CK during a normal operation of the oscillator 1, and the clock signal CK1 may be selected as the clock signal CK when the clock signal CK1 is inspected.

The temperature sensor 42 is a thermosensitive element that measures a temperature and outputs a temperature measurement signal TS3 having a voltage level corresponding to the measured temperature. The temperature sensor 42 is built in the control IC 4 and measures the temperature of the control IC 4. As shown in FIG. 1, the control IC 4 is disposed at a place close to the outer-side lid 22, a distance between the resonator element 6 and the temperature sensor 42 is larger than a distance between the resonator element 6 and the temperature sensor 82 included in the oscillation IC 8, and the temperature of the control IC 4 is easily affected by the temperature of the outside air of the oscillator 1. Therefore, assuming that the heat generation amount of the control IC 4 is substantially constant, the temperature sensor 42 can measure a temperature change in the outside air of the oscillator 1. The temperature measurement signal TS2 output from the temperature sensor 72 is input to the control IC 4. The temperature sensor 72 may be, for example, a sensor that uses the temperature dependency of a forward voltage of a PN junction of a diode.

The selector 41 selects and outputs any one of the temperature measurement signal TS1 output from the oscillation IC 8, the temperature measurement signal TS2 output from the heat generation IC 7, or the temperature measurement signal TS3 output from the temperature sensor 42. In the present embodiment, the selector 41 selects the temperature measurement signals TS1, TS2, and TS3 in a time division and periodically outputs the temperature measurement signals.

The A/D converter 43 converts the temperature measurement signals TS1, TS2, and TS3, which are analog signals output from the selector 41 in a time division, into temperature codes DTS1, DTS2, and DTS3, which are digital signals, respectively. In the A/D converter 43, the temperature measurement signals TS1, TS2, and TS3 may be subjected to voltage level conversion using resistance division or the like and then converted into the temperature codes DTS1, DTS2, and DTS3.

The microcontroller 40 includes a CPU 10 and a non-volatile memory 13. CPU is an abbreviation for central processing unit. The memory 13 stores a temperature control program 131.

The CPU 10 executes the temperature control program 131 to function as a temperature control circuit 11. The temperature control circuit 11 controls an operation of the temperature control element 71 built in the heat generation IC 7. Specifically, the temperature control circuit 11 outputs a temperature control code DOVC to control the heat generation amount of the temperature control element 71, based on the temperature code DTS1 and temperature control data 91 stored in the non-volatile memory 90. For example, the temperature control data 91 may include information regarding the target set temperature of the resonator element 6 or information regarding a gain for controlling the heat generation amount of the temperature control element 71. Alternatively, when the target set temperature of the resonator element 6 fluctuates depending on the outside air temperature, the temperature control data 91 may include information indicating a relationship between the temperature code DTS3 and the set temperature. In this case, the temperature control circuit 11 outputs the temperature control code DOVC based on the temperature codes DTS1 and DTS3 and the temperature control data 91.

As described above, the microcontroller 40 performs temperature control processing of controlling the operation of the temperature control element 71 based on the temperature control program 131. In the present embodiment, the external device 100 can rewrite the temperature control program 131 via the interface circuit 49. For example, in a manufacturing step of the oscillator 1, an inspection device, which is the external device 100, writes the desired temperature control program 131 in the memory 13 of the microcontroller 40. Therefore, the temperature control processing by the microcontroller 40 can be selected by the temperature control program 131. Details of the temperature control processing by the microcontroller 40 will be described below.

Further, the memory 13 stores a temperature compensation program 132. The CPU 10 executes the temperature compensation program 132 to function as a temperature compensation circuit 12. The temperature compensation circuit 12 performs temperature compensation on the frequency of the oscillation signal OSCO generated by causing the resonator element 6 to oscillate by the oscillation circuit 81 built in the oscillation IC 8. Specifically, the temperature compensation circuit 12 outputs the division ratio control signal DIVC for causing the fractional N-PLL circuit 45 to output the clock signal CK1 having a constant frequency regardless of the temperature, based on the temperature code DTS3 and temperature compensation data 92 stored in the memory 90. For example, the temperature compensation data 92 may be table information indicating a relationship between the temperature code DTS3 and the frequency of the oscillation signal OSCO, or may be information regarding a coefficient value of each order of a formula indicating the relationship. Alternatively, the temperature compensation data 92 may be information indicating a relationship between the temperature code DTS3 and a value of a fractional division ratio of the fractional N-PLL circuit 45, which is calculated from the relationship between the temperature code DTS3 and the frequency of the oscillation signal OSCO.

As described above, the microcontroller 40 performs temperature compensation processing of performing the temperature compensation on the frequency of the oscillation signal OSCO, based on the temperature compensation program 132. In the present embodiment, the external device 100 can rewrite the temperature compensation program 132 via the interface circuit 49. For example, in the manufacturing step of the oscillator 1, an inspection device, which is the external device 100, writes the desired temperature compensation program 132 in the memory 13 of the microcontroller 40. Therefore, the temperature compensation processing by the microcontroller 40 can be selected by the temperature compensation program 132. Details of the temperature compensation processing by the microcontroller 40 will be described below.

The D/A converter 44 converts the temperature control code DOVC, which is a digital signal output from the temperature control circuit 11, into the temperature control signal OVC, which is an analog signal. The temperature control signal OVC is supplied to the temperature control element 71 of the heat generation IC 7.

The interface circuit 49 is a circuit that performs data communication between the oscillator 1 and the external device 100 coupled to the oscillation 1. Specifically, the interface circuit 49 writes or reads out data to and from the memory 90, the register 94, or the memory 13 of the microcontroller 40, in response to a request from the external device 100. The interface circuit 49 may be, for example, an interface circuit corresponding to an I²C bus or an interface circuit corresponding to an SPI bus. I²C is an abbreviation for inter-integrated circuit. Further, SPI is an abbreviation for serial peripheral interface.

In an inspection step when the oscillator 1 is manufactured, the inspection device, which is the external device 100, may set the switch control signal SWC for causing the switch circuit 47 to select the clock signal CK1 via the interface circuit 49 to inspect the clock signal CK1. Further, the inspection device, which is the external device 100, writes the temperature control data 91 and the temperature compensation data 92 in the memory 90 and writes the temperature control program 131 and the temperature compensation program 132 in the memory 13, via the interface circuit 49. The temperature control data 91 and the temperature compensation data 92 may be set in the register 94 by the external device 100 when the oscillator 1 is started.

1-3. Temperature Control Processing by Microcontroller

In the present embodiment, the microcontroller 40 performs any one of normal control, high-speed start control, or maximum power suppression control as temperature control of the resonator element 6 based on the temperature control program 131. That is, in the present embodiment, with a change in the temperature control program 131, the normal control, the high-speed start control, or the maximum power suppression control is selectable as the temperature control by the microcontroller 40. For example, the microcontroller 40 may perform any one of the high-speed start control or the maximum power suppression control in a start period after the temperature control element 71 starts to operate. Further, the microcontroller 40 can also perform set temperature correction control of correcting the target set temperature of the resonator element 6 according to the outside air temperature, based on the temperature control program 131. That is, in the present embodiment, with the change in the temperature control program 131, whether or not to cause the microcontroller 40 to perform the set temperature correction control is selectable. Hereinafter, the normal control, the high-speed start control, the maximum power suppression control, and the set temperature correction control will be described in detail.

1-3-1. Normal Control

Figure 6:
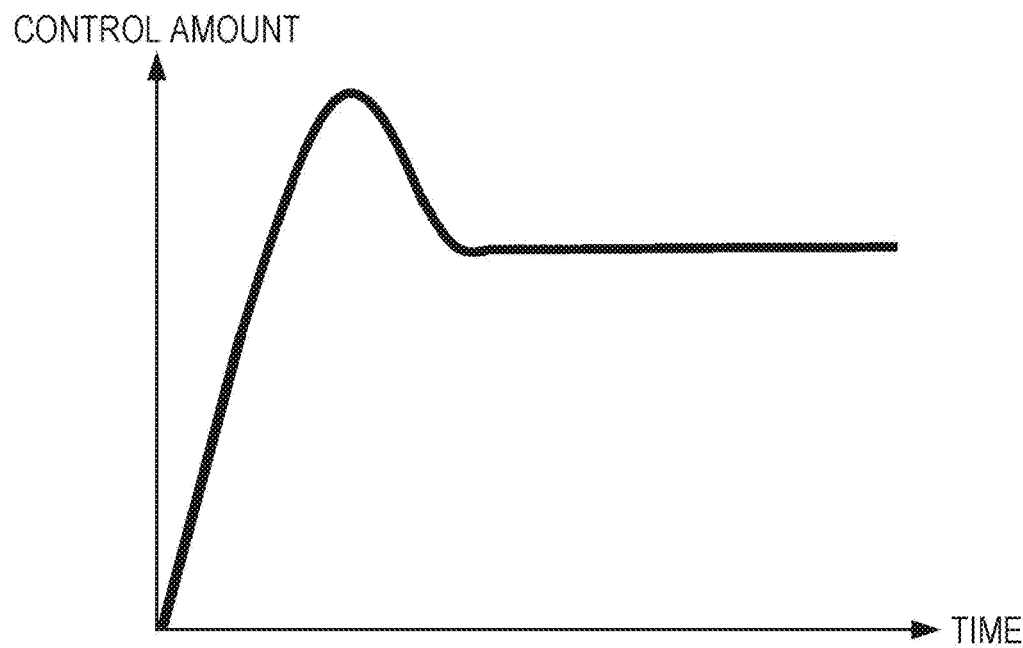
FIG. 6 is a graph showing an outline of a time change in a control amount of a temperature control element when normal control is performed.
Figure 7:
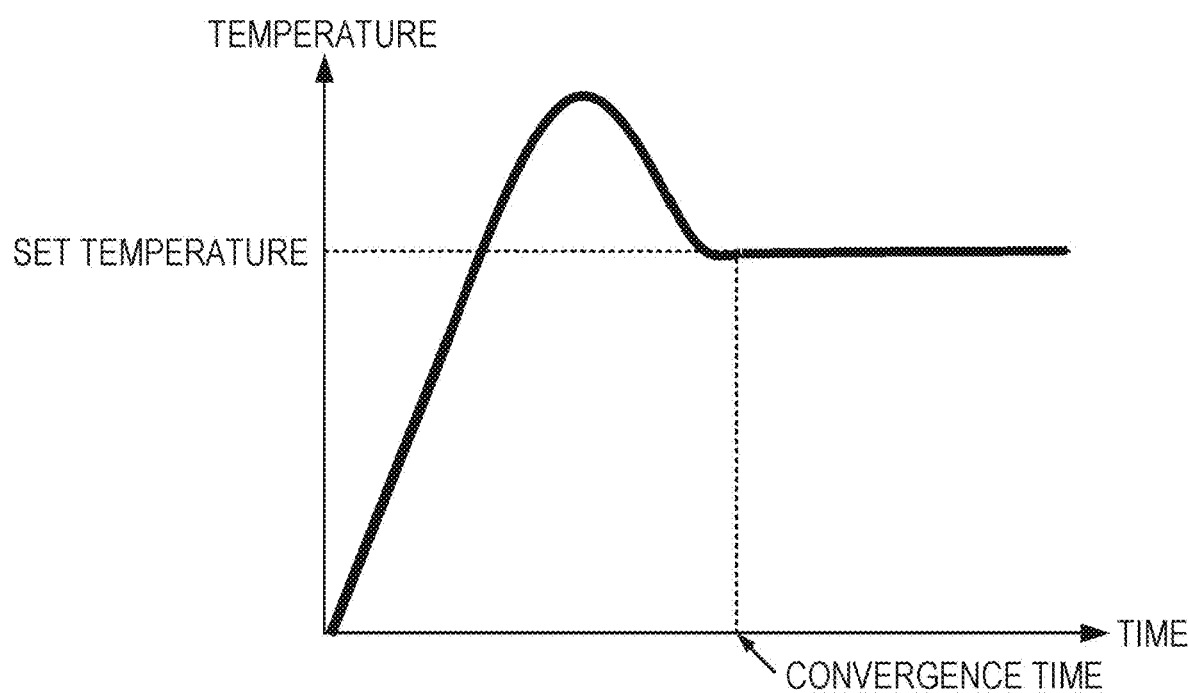
FIG. 7 is a graph showing an outline of a time change in a temperature of a resonator element when the normal control is performed.

The normal control is to control the heat generation amount of the temperature control element 71 for bringing a difference between the target set temperature of the resonator element 6 and the temperature of the resonator element 6 close to zero. FIG. 6 and FIG. 7 are graphs respectively showing outlines of time changes in a control amount of the temperature control element 71 and the temperature of the resonator element 6 when the microcontroller 40 performs the normal control.

For example, when the set temperature is 80° C., the temperature of the resonator element 6 is close to the outside air temperature at a time of start of the oscillator 1. Thus, as shown in FIGS. 6 and 7, the control amount of the temperature control element 71 increases to cause the temperature control element 71 to generate heat, and as a result, the temperature of the resonator element 6 increases. When the temperature of the resonator element 6 reaches the set temperature, then the control amount of the temperature control element 71 reaches a peak and decreases. Accordingly, the temperature of the resonator element 6 exceeds the set temperature, reaches a peak, and then decreases. As the temperature of the resonator element 6 is closer to the set temperature, a decrease rate of the control amount becomes smaller and becomes a constant value. As a result, the temperature of the resonator element 6 also converges to the set temperature.

Figure 8:
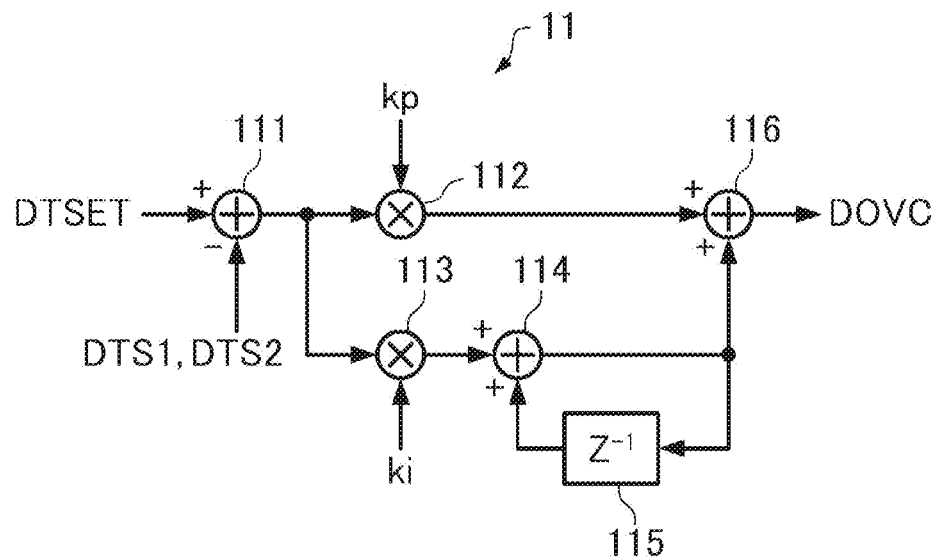
FIG. 8 is a diagram showing a configuration example of a temperature control circuit to realize the normal control.

FIG. 8 is a diagram showing a configuration example of the temperature control circuit 11 to realize the normal control. As shown in FIG. 8, the temperature control circuit 11 includes a subtractor 111, multipliers 112 and 113, an adder 114, a delay element 115, and an adder 116.

The subtractor 111 outputs a value obtained by subtracting the temperature code DTS1 from a set temperature code DTSET. The set temperature code DTSET is a digital code corresponding to the set temperature, and is included in the temperature control data 91. Further, as described above, the temperature code DTS1 is a digital code corresponding to a voltage of the temperature measurement signal TS1 output from the oscillation IC 8.

The multiplier 112 outputs a product of the output value of the subtractor 111 and a gain kp. The multiplier 113 outputs a product of the output value of the subtractor 111 and a gain ki. The gains kp and Ki are included in the temperature control data 91.

The adder 114 outputs a value obtained by adding an output value of the multiplier 113 and an output value of the delay element 115. The delay element 115 outputs the output value of the adder 114 with a delay of a predetermined time. For example, the predetermined time may be a time corresponding to a cycle in which the A/D converter 43 updates the temperature code DTS1.

The adder 116 adds an output value of the multiplier 112 and the output value of the adder 114 to output the temperature control code DOVC.

The temperature control circuit 11 having such a configuration realizes the normal control of the temperature control element 71 by PI control. The output value of the multiplier 112 corresponds to a value of a proportional term P, and the output value of the adder 114 corresponds to a value of an integral term I.

In the example of FIG. 8, the temperature code DTS1 is input to the subtractor 111, assuming that the temperature of the oscillation IC 8 is closer to the temperature of the resonator element 6 than the temperature of the heat generation IC 7. However, when the temperature of the heat generation IC 7 is closer to the temperature of the resonator element 6 than the temperature of the oscillation IC 8, the temperature code DTS2 corresponding to a voltage of the temperature measurement signal TS2 output from the heat generation IC 7 may be input to the subtractor 111.

As described above, the microcontroller 40 can perform, based on the temperature control program 131, the normal control based on the value obtained by multiplying the difference between the set temperature and the temperature measured by the temperature sensor 82 or the temperature sensor 72 by the gain.

1-3-2. High-Speed Start Control

Figure 9:
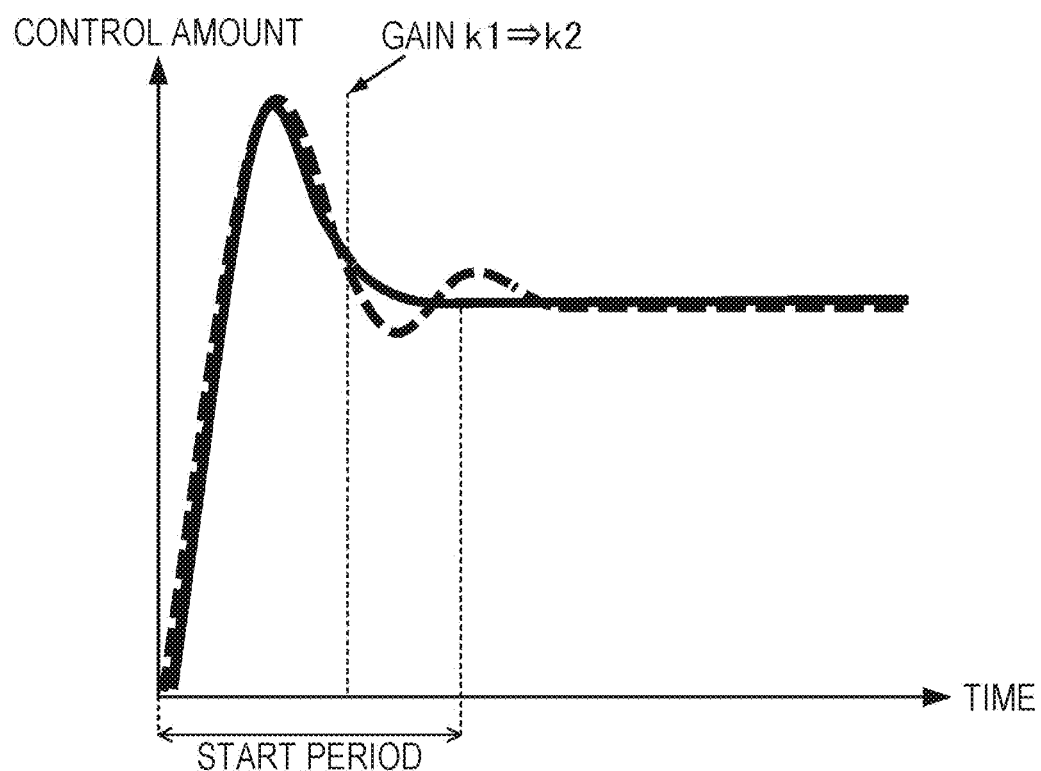
FIG. 9 is a graph showing an outline of a time change in the control amount of the temperature control element when high-speed start control is performed.
Figure 10:
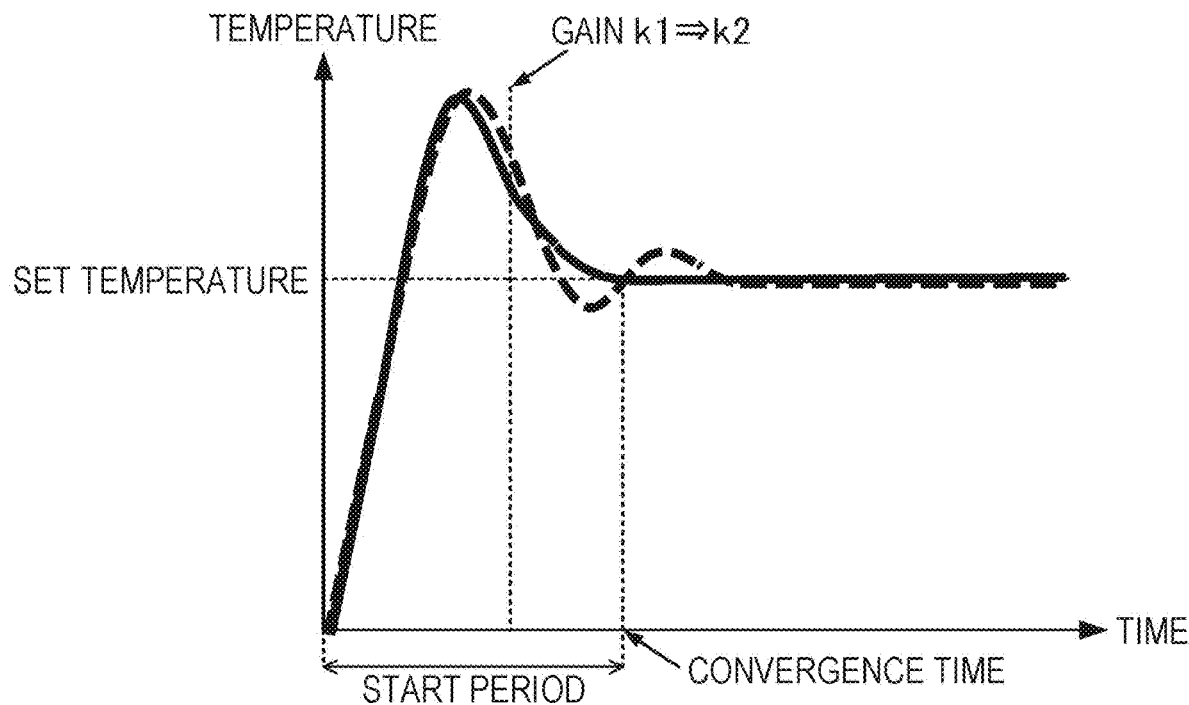
FIG. 10 is a graph showing an outline of a time change in the temperature of the resonator element when the high-speed start control is performed.

The high-speed start control is to control the heat generation amount of the temperature control element 71 for bringing the difference between the target set temperature of the resonator element 6 and the temperature of the resonator element 6 close to zero at a high speed after the oscillator 1 is started. FIGS. 9 and 10 are graphs respectively showing outlines of time changes in the control amount of the temperature control element 71 and the temperature of the resonator element 6 when the microcontroller 40 performs the high-speed start control.

As shown in FIGS. 9 and 10, in the start period after the temperature control element 71 starts to operate, the control amount of the temperature control element 71 increases to cause the temperature control element 71 to generate heat, and as a result, the temperature of the resonator element 6 increases. When the start period is started, the gain for controlling the temperature control element 71 is set to a first value k1 larger than that during the normal control, and an increase rate of the control amount or the temperature is large as compared with the case of the normal control shown in FIGS. 6 and 7. Therefore, the temperature of the resonator element 6 reaches the set temperature at an early stage, and then the control amount of the temperature control element 71 reaches a peak and decreases. Accordingly, the temperature of the resonator element 6 exceeds the set temperature, reaches a peak, and then decreases. In the high-speed start control, the decrease rate of the control amount or the temperature is also large as compared with the case of the normal control shown in FIGS. 6 and 7. Thereafter, the gain is switched to a second value k2 smaller than the first value k1, and as the temperature of the resonator element 6 is closer to the set temperature, the decrease rate of the control amount becomes smaller and becomes a constant value. As a result, the temperature of the resonator element 6 also converges to the set temperature, and the start period is ended. For example, the second value k2 is the same as the value of the gain during the normal control. FIGS. 9 and 10 respectively show, by broken lines, time changes in the control amount of the temperature control element 71 and the temperature of the resonator element 6 when the gain maintains the first value k1 in the start period. When the gain maintains the first value k1 in the start period, the gain is too large, and thus, it takes time for the control amount or the temperature to converge to a constant value.

Figure 11:
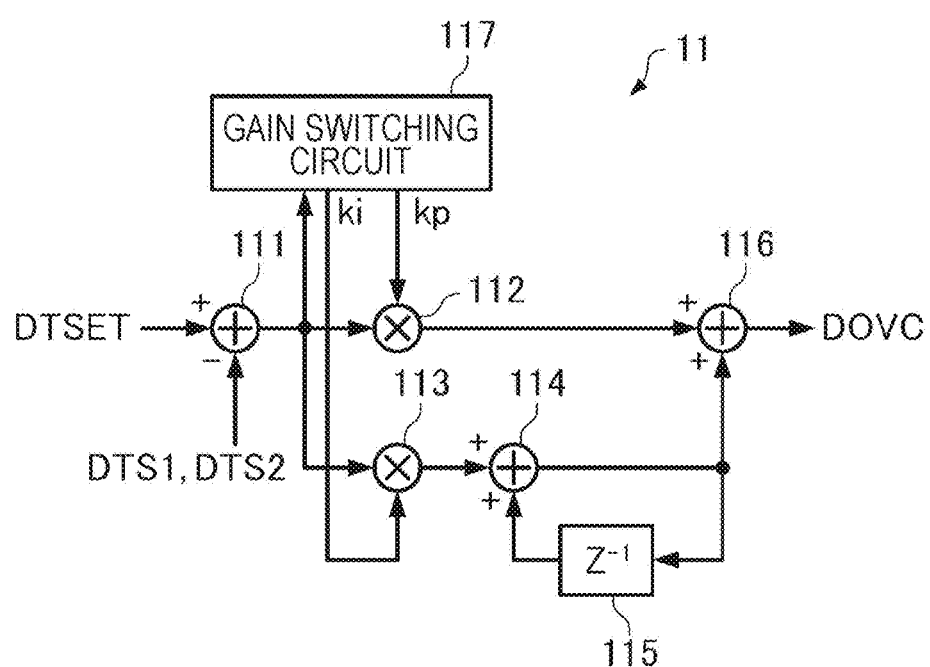
FIG. 11 is a diagram showing a configuration example of the temperature control circuit to realize the high-speed start control.

FIG. 11 is a diagram showing a configuration example of the temperature control circuit 11 to realize the high-speed start control. In FIG. 11, the same reference numerals are assigned to the same components as those in FIG. 8. As shown in FIG. 11, the temperature control circuit 11 includes the subtractor 111, the multipliers 112 and 113, the adder 114, the delay element 115, the adder 116, and a gain switching circuit 117. Since the subtractor 111, the multipliers 112 and 113, the adder 114, the delay element 115, and the adder 116 operate as described above, the description thereof will be omitted.

The gain switching circuit 117 switches the gains kp and Ki respectively from first values to second values based on the output value of the subtractor 111, which is the difference between the set temperature code DTSET and the temperature code DTS1. For example, when the output value of the subtractor 111 becomes the maximum and then becomes equal to or less than a predetermined threshold value, the gain switching circuit 117 switches the gains kp and Ki respectively from first values kp1 and Ki1 to second values kp2 and Ki2. The predetermined threshold value is decided as appropriate based on a simulation result or an evaluation result such that the control amount of the temperature control element 71 or the temperature of the resonator element 6 does not change with time shown by broken lines in FIGS. 9 and 10, but changes with time shown by solid lines in FIGS. 9 and 10.

In the examples of FIGS. 9 and 10, in the start period, the temperature control circuit 11 switches and decreases the gain in one stage, but may switch and decrease the gain in two or more stages.

As described above, the microcontroller 40 can perform, based on the temperature control program 131, the high-speed start control in which the gains kp and ki to be multiplied to the difference between the set temperature and the temperature measured by the temperature sensor 82 or the temperature sensor 72 are respectively switched from the first values kp1 and Ki1 to the second values kp2 and Ki2, which are smaller than the first values kp1 and Ki1, in the start period after the temperature control element 71 starts to operate. The microcontroller 40 performs the normal control after the start period is ended. In the microcontroller 40, with the high-speed start control in the start period, a time until the temperature of the resonator element 6 converges to the set temperature can be shortened, as compared with when the normal control is performed, even in the start period.

1-3-3. Maximum Power Suppression Control

Figure 12:
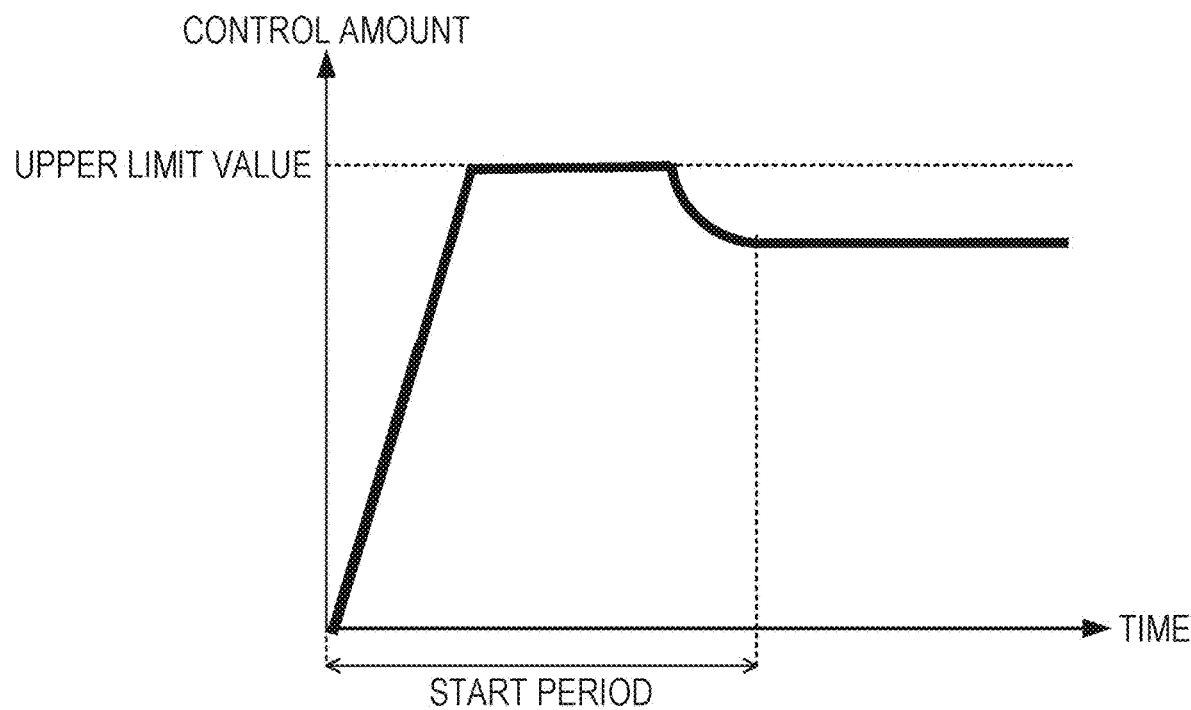
FIG. 12 is a graph showing an outline of a time change in the control amount of the temperature control element when maximum power suppression control is performed.
Figure 13:
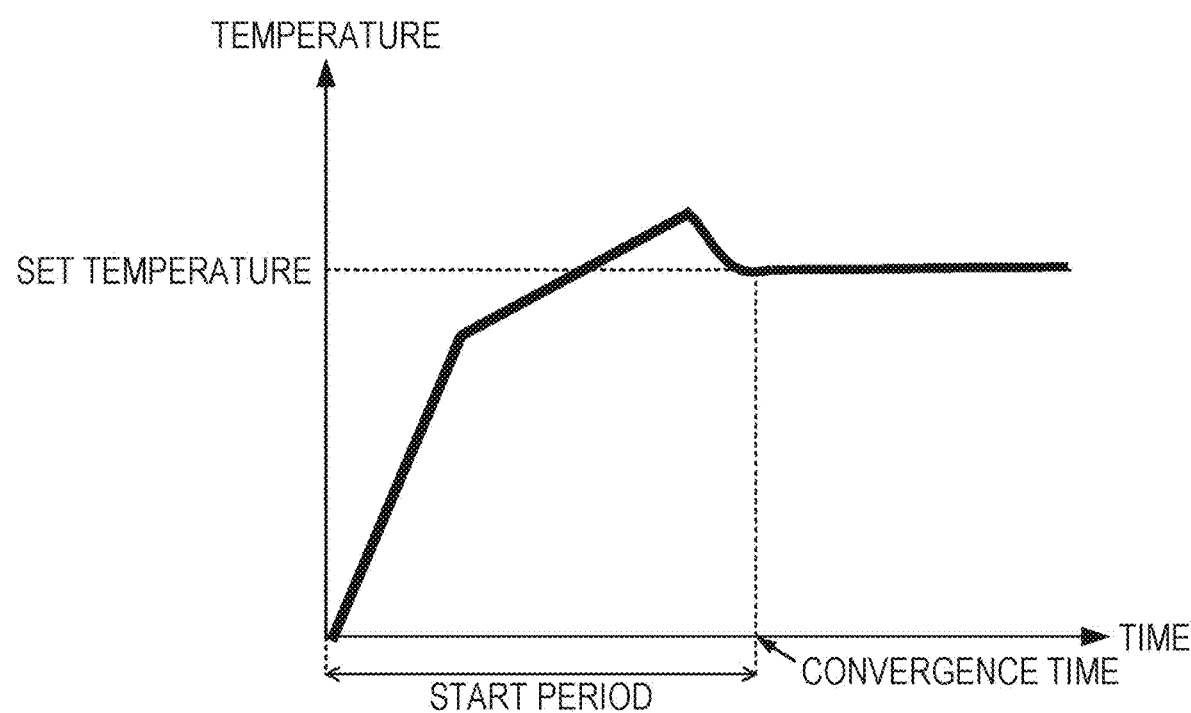
FIG. 13 is a graph showing an outline of a time change in the temperature of the resonator element when the maximum power suppression control is performed.

The maximum power suppression control is to control the heat generation amount of the temperature control element 71 that limits power consumption by the temperature control element 71 to a preset upper limit value or less after the oscillator 1 is started. FIGS. 12 and 13 are graphs respectively showing outlines of time changes in the control amount of the temperature control element 71 and the temperature of the resonator element 6 when the microcontroller 40 performs the maximum power suppression control.

As shown in FIGS. 12 and 13, in the start period after the temperature control element 71 starts to operate, the control amount of the temperature control element 71 increases to cause the temperature control element 71 to generate heat, and as a result, the temperature of the resonator element 6 increases. The gain for controlling the temperature control element 71 is set to the same value as during the normal control, and the increase rate of the control amount or the temperature is the same as that in the case of the normal control shown in FIGS. 6 and 7. Thereafter, when the control amount reaches a preset upper limit value, the upper limit value is maintained. In a period during which the control amount maintains the upper limit value, the increase rate of the temperature of the resonator element 6 decreases. Thereafter, the temperature of the resonator element 6 reaches the set temperature, and the control amount of the temperature control element 71 decreases from the upper limit value. Accordingly, the temperature of the resonator element 6 exceeds the set temperature, reaches a peak, and then decreases. The decrease rate of the control amount or the temperature is the same as that in the case of the normal control shown in FIGS. 6 and 7. Thereafter, as the temperature of the resonator element 6 is closer to the set temperature, the decrease rate of the control amount becomes smaller and becomes a constant value. As a result, the temperature of the resonator element 6 also converges to the set temperature, and the start period is ended.

Figure 14:
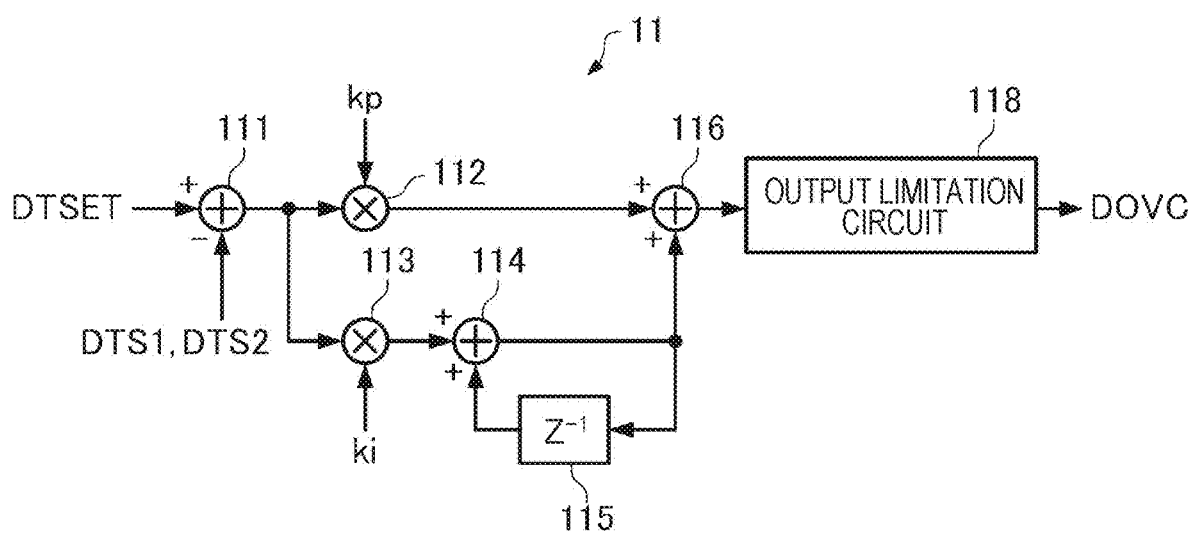
FIG. 14 is a diagram showing a configuration example of the temperature control circuit to realize the maximum power suppression control.

FIG. 14 is a diagram showing a configuration example of the temperature control circuit 11 to realize the maximum power suppression control. In FIG. 14, the same reference numerals are assigned to the same components as those in FIG. 8. As shown in FIG. 14, the temperature control circuit 11 includes the subtractor 111, the multipliers 112 and 113, the adder 114, the delay element 115, the adder 116, and an output limitation circuit 118. Since the subtractor 111, the multipliers 112 and 113, the adder 114, the delay element 115, and the adder 116 operate as described above, the description thereof will be omitted.

The output limitation circuit 118 compares the output value of the adder 116 with a predetermined upper limit value, and outputs the output value of the adder 116 as the temperature control code DOVC when the output value of the adder 116 is equal to or less than the upper limit value and outputs the upper limit value as the temperature control code DOVC when the output value of the adder 116 is larger than the upper limit value. The upper limit value is decided as appropriate based on a simulation result or an evaluation result such that the power consumption by the temperature control element 71 is the preset upper limit value.

As described above, the microcontroller 40 can perform, based on the temperature control program 131, the maximum power suppression control in which the power consumption by the temperature control element 71 is limited to the preset upper limit value or less, in the start period after the temperature control element 71 starts to operate. The microcontroller 40 performs the normal control after the start period is ended. In the microcontroller 40, with the maximum power suppression control in the start period, the time until the temperature of the resonator element 6 converges to the set temperature is lengthened, but stable operations of various systems using the oscillator 1 can be ensured, as compared with when the normal control is performed, even in the start period.

1-3-4. Set Temperature Correction Control

Figure 15:
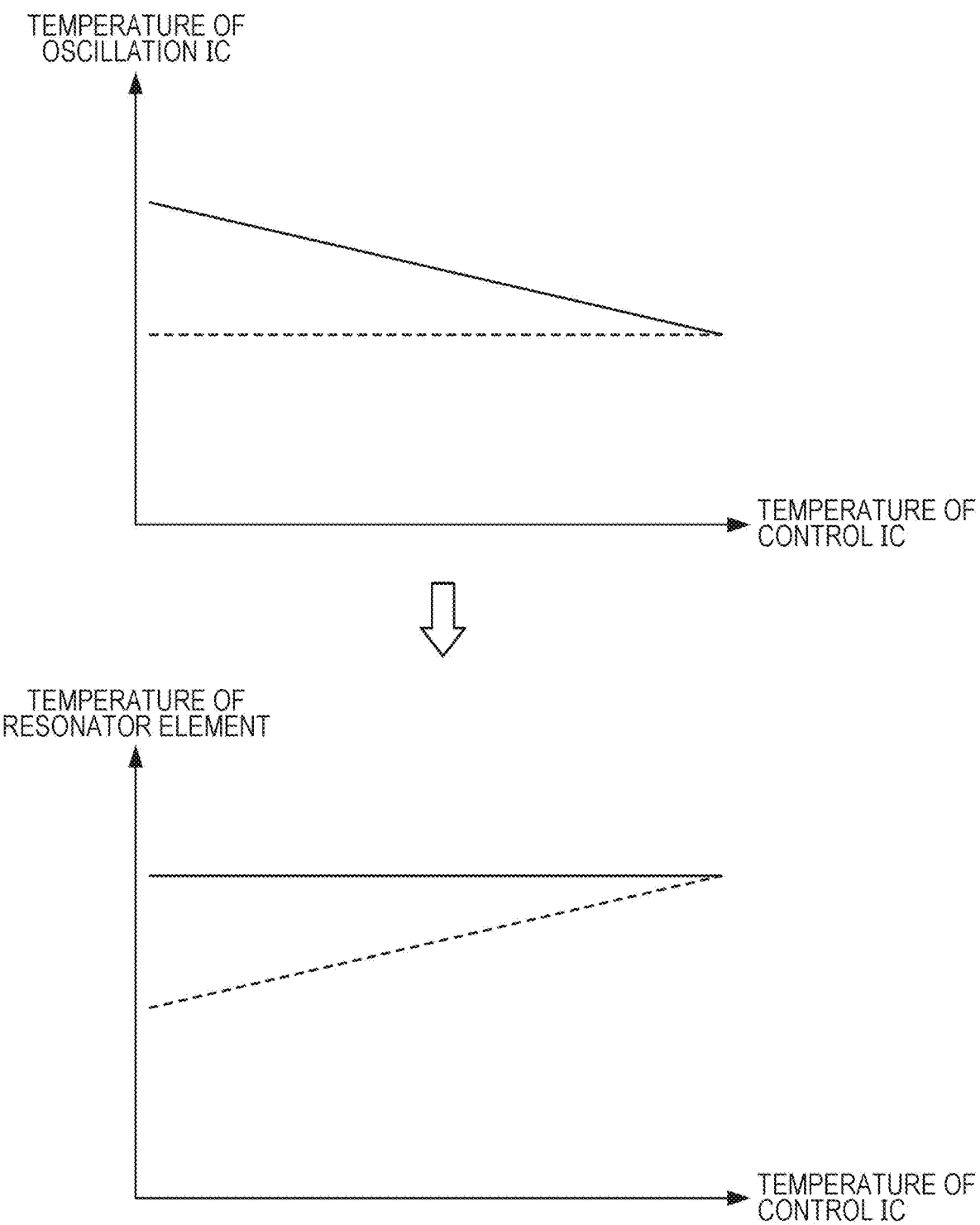
FIG. 15 is a graph showing an outline of a relationship between a temperature of a control IC, a temperature of an oscillation IC, and the temperature of the resonator element when set temperature correction control is performed.

The set temperature correction control is to control the heat generation amount of the temperature control element 71 such that the target set temperature of the resonator element 6 is higher as the temperature of the resonator element 6 is lower. FIG. 15 is a graph showing an outline of a relationship between the temperature of the control IC 4, the temperature of the oscillation IC 8, and the temperature of the resonator element 6 when the microcontroller 40 performs the set temperature correction control. In FIG. 15, the relationship when the microcontroller 40 performs the set temperature correction control is shown by a solid line, and the relationship when the microcontroller 40 does not perform the set temperature correction control and performs the normal control is also shown by a broken line.

In FIG. 15, as shown by the broken line, when the microcontroller 40 performs the normal control, the heat generation amount of the temperature control element 71 is controlled such that the temperature of the oscillation IC 8 is constant regardless of the temperature of the control IC 4. In this case, since the temperature of the resonator element 6 changes depending on the outside air temperature, the temperature of the resonator element 6 is lower as the temperature of the control IC 4 is lower. On the contrary, when the microcontroller 40 performs the set temperature correction control, the temperature of the oscillation IC 8 is higher as the temperature of the control IC 4 is higher. In this case, since the temperature of the resonator element 6 is lower as the temperature of the control IC 4 is lower, the fluctuation of the temperature of the resonator element 6 due to the change in the set temperature and the fluctuation of the temperature of the resonator element 6 due to the change in the outside air temperature are canceled out, and the temperature of the resonator element 6 is kept constant.

Figure 16:
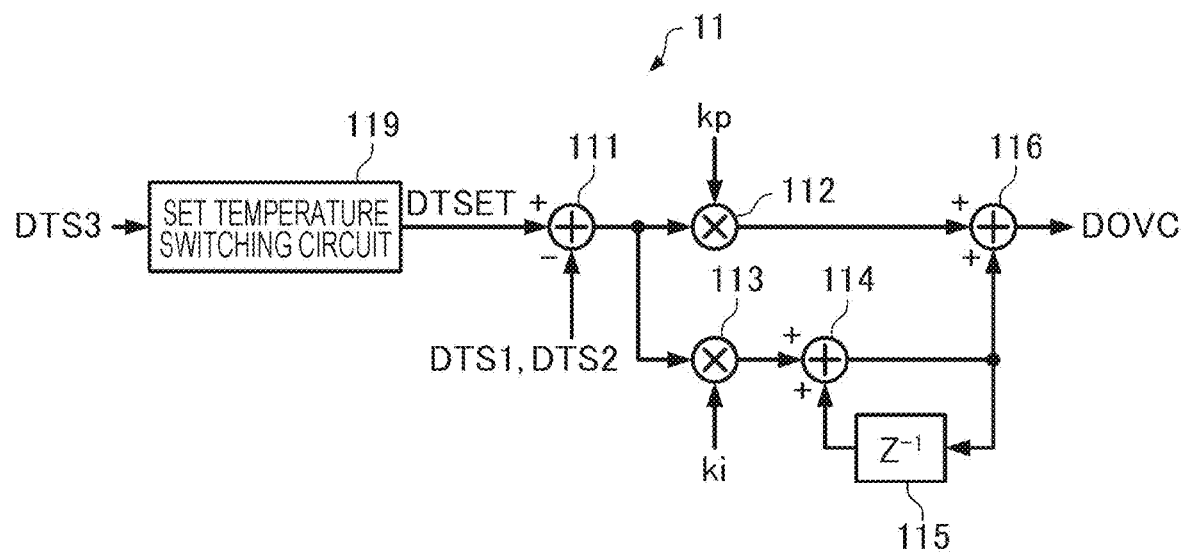
FIG. 16 is a diagram showing a configuration example of the temperature control circuit to realize the set temperature correction control.

FIG. 16 is a diagram showing a configuration example of the temperature control circuit 11 to realize the set temperature correction control. In FIG. 16, the same reference numerals are assigned to the same components as those in FIG. 8. As shown in FIG. 16, the temperature control circuit 11 includes the subtractor 111, the multipliers 112 and 113, the adder 114, the delay element 115, the adder 116, and a set temperature switching circuit 119. Since the subtractor 111, the multipliers 112 and 113, the adder 114, the delay element 115, and the adder 116 operate as described above, the description thereof will be omitted.

The set temperature switching circuit 119 switches the output set temperature code DTSET according to the temperature code DTS3. As described above, the temperature code DTS3 is a digital code corresponding to a voltage of the temperature measurement signal TS3 output from the temperature sensor 42. For example, the temperature control data 91 may include information indicating a relationship between the temperature code DTS3 and the set temperature code DTSET, and the set temperature switching circuit 119 may switch the set temperature code DTSET based on the temperature code DTS3 and the temperature control data 91. For example, the information indicating the relationship between the temperature code DTS3 and the set temperature code DTSET is generated based on the set temperature code DTSET where the temperature code DTS1 is stabilized at a desired value when the normal control is performed by causing the set temperature code DTSET to change for each of a plurality of temperature codes DTS3 different from each other, by simulation and evaluation of the oscillator 1.

As described above, the microcontroller 40 can perform, based on the temperature control program 131, the set temperature correction control in which the target set temperature of the resonator element 6 is higher as the temperature measured by the temperature sensor 42 is lower. With the performing of the set temperature correction control, the microcontroller 40 can keep the temperature of the resonator element 6 constant regardless of the outside air temperature of the oscillator 1, and thus a frequency deviation of the oscillation signal OSCO can be reduced.

Figure 17:
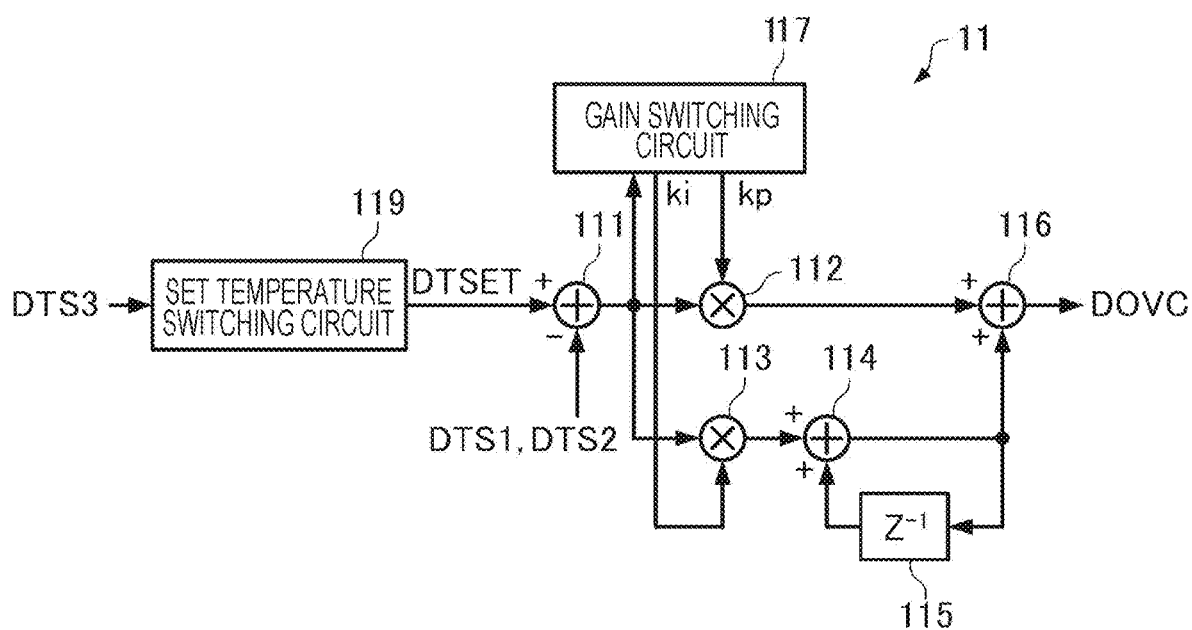
FIG. 17 is a diagram showing a configuration example of the temperature control circuit to realize the high-speed start control and the set temperature correction control.

The microcontroller 40 may perform the high-speed start control and the set temperature correction control based on the temperature control program 131. FIG. 17 is a diagram showing a configuration example of the temperature control circuit 11 to realize the high-speed start control and the set temperature correction control. In FIG. 17, the same reference numerals are assigned to the same components as those in FIG. 11 or FIG. 16. The circuit shown in FIG. 17 is a combination of the circuit shown in FIG. 11 and the circuit shown in FIG. 16, and the description of the operation of the circuit will be omitted.

Figure 18:
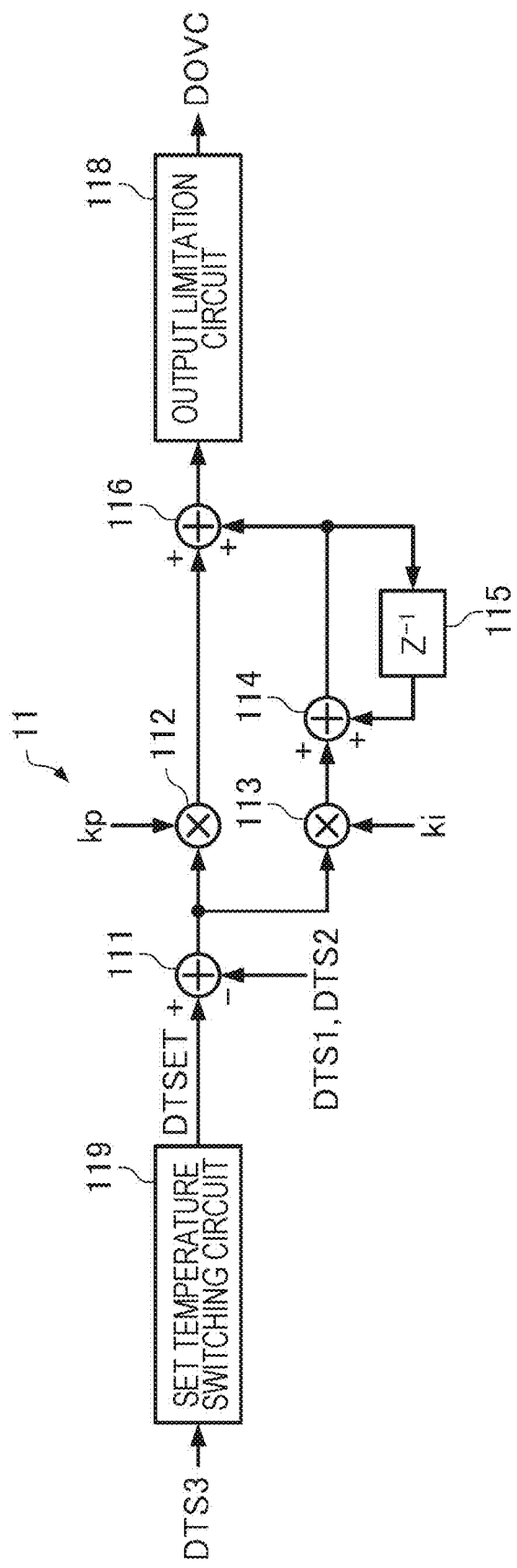
FIG. 18 is a diagram showing a configuration example of the temperature control circuit to realize the maximum power suppression control and the set temperature correction control.

Further, the microcontroller 40 may perform the maximum power suppression control and the set temperature correction control based on the temperature control program 131. FIG. 18 is a diagram showing a configuration example of the temperature control circuit 11 to realize the maximum power suppression control and the set temperature correction control. In FIG. 18, the same reference numerals are assigned to the same components as those in FIG. 14 or FIG. 16. The circuit shown in FIG. 18 is a combination of the circuit shown in FIG. 14 and the circuit shown in FIG. 16, and the description of the operation of the circuit will be omitted.

1-4. Temperature Compensation Processing by Microcontroller

In the present embodiment, the microcontroller 40 performs, based on the temperature compensation program 132, at least any one of high-order function compensation using a polynomial equation of second-order or higher or neural network compensation using a neural network, as the temperature compensation of the oscillation signal OSCO. That is, in the present embodiment, with a change in the temperature compensation program 132, at least one of the high-order function compensation or the neural network compensation is selectable as the temperature compensation by the microcontroller 40. Hereinafter, the high-order function compensation and the neural network compensation will be described in detail.

1-4-1. High-Order Function Compensation

The high-order function compensation is temperature compensation that corrects the fluctuation of the frequency of the oscillation signal OSCO generated due to a slight fluctuation in the temperature of the resonator element 6 by the influence of the outside air temperature of the oscillator 1, using the polynomial equation of second-order or higher relating to the temperature of the resonator element 6.

Figure 19:
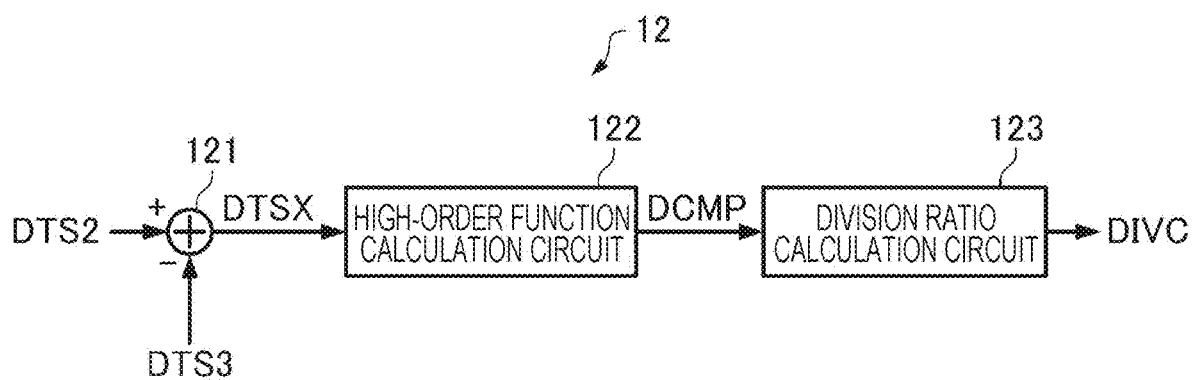
FIG. 19 is a diagram showing a configuration example of a temperature compensation circuit to realize high-order function compensation.

FIG. 19 is a diagram showing a configuration example of the temperature compensation circuit 12 to realize high-order function compensation. As shown in FIG. 19, the temperature compensation circuit 12 includes a subtractor 121, a high-order function calculation circuit 122, and a division ratio calculation circuit 123.

The subtractor 121 subtracts the temperature code DTS3 from the temperature code DTS2 and outputs a temperature code DTSX. As described above, the temperature code DTS2 is a digital code corresponding to the voltage of the temperature measurement signal TS2 output from the heat generation IC 7. Further, the temperature code DTS3 is a digital code corresponding to the voltage of the temperature measurement signal TS3 output from the temperature sensor 42.

The high-order function calculation circuit 122 calculates a temperature compensation code DCMP by the polynomial equation shown in Equation (1), in which the temperature code DTSX output from the subtractor 121 is set as a variable. Specifically, the high-order function calculation circuit 122 substitutes the temperature code DTSX into Equation (1) to calculate the temperature compensation code DCMP. Coefficients $a_n$ to $a_0$ in Equation (1) are included in the temperature compensation data 92. n is an integer of two or more, and is preferably three or more in order to perform the temperature compensation on the frequency of the oscillation signal OSCO with high accuracy.

$$DCMP = a_n \cdot DTSX^n + a_{n-1} \cdot DTSX^{n-1} + \ldots + a_1 \cdot DTSX + a_0 \quad (1)$$

The division ratio calculation circuit 123 calculates the division ratio of the fractional N-PLL circuit 45 based on the temperature compensation code DCMP calculated by the high-order function calculation circuit 122 and performs the delta sigma modulation on the division ratio to generate the division ratio control signal DIVC. The fractional N-PLL circuit 45 performs the temperature compensation on the frequency of the oscillation signal OSCO, and thus the clock signal CK1 having high frequency accuracy is obtained.

As described above, the microcontroller 40 can perform, based on the temperature compensation program 132, the high-order function compensation using the polynomial equation of second-order or higher, as the temperature compensation of the oscillation signal OSCO.

1-4-2. Neural Network Compensation

Figure 20:
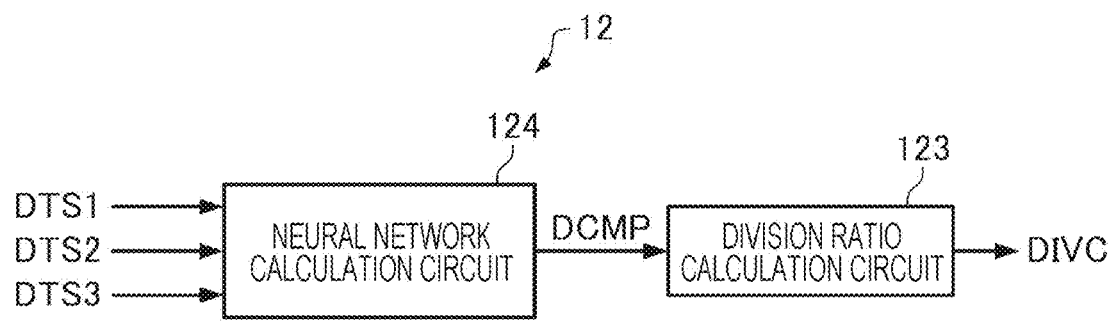
FIG. 20 is a diagram showing a configuration example of the temperature compensation circuit to realize neural network compensation.

FIG. 20 is a diagram showing a configuration example of the temperature compensation circuit 12 to realize the neural network compensation. As shown in FIG. 20, the temperature compensation circuit 12 includes the division ratio calculation circuit 123 and a neural network calculation circuit 124. In FIG. 20, the same reference numerals are assigned to the same components as those in FIG. 19.

The neural network calculation circuit 124 includes a neural network that has learned a relationship between the temperature codes DTS1, DTS2, and DTS3 and the temperature compensation code DCMP. Specifically, the neural network has learned a weight and a bias in a neural network calculation for obtaining the temperature compensation code DCMP from the temperature codes DTS1, DTS2, and DTS3, using actual measurement data of the temperature compensation code DCMP as supervisor data. The neural network calculation circuit 124 receives the temperature codes DTS1, DTS2, and DTS3, performs the neural network calculation, and outputs the temperature compensation code DCMP.

The temperature code input to the neural network may be a part of the temperature codes DTS1, DTS2, and DTS3, and for example, a difference between the temperature code DTS2 and the temperature code DTS3 may be input. In this case, the neural network may have learned the weight and bias in the neural network calculation for obtaining the temperature compensation code DCMP from the difference between the temperature code DTS2 and the temperature code DTS3, using the actual measurement data of the temperature compensation code DCMP as the supervisor data.

The division ratio calculation circuit 123 calculates the division ratio of the fractional N-PLL circuit 45 based on the temperature compensation code DCMP calculated by the neural network calculation circuit 124 and performs the delta sigma modulation on the division ratio to generate the division ratio control signal DIVC. The fractional N-PLL circuit 45 performs the temperature compensation on the frequency of the oscillation signal OSCO, and thus the clock signal CK1 having high frequency accuracy is obtained.

As described above, the microcontroller 40 can perform, based on the temperature compensation program 132, the neural network compensation using the neural network as the temperature compensation of the oscillation signal OSCO.

Figure 21:
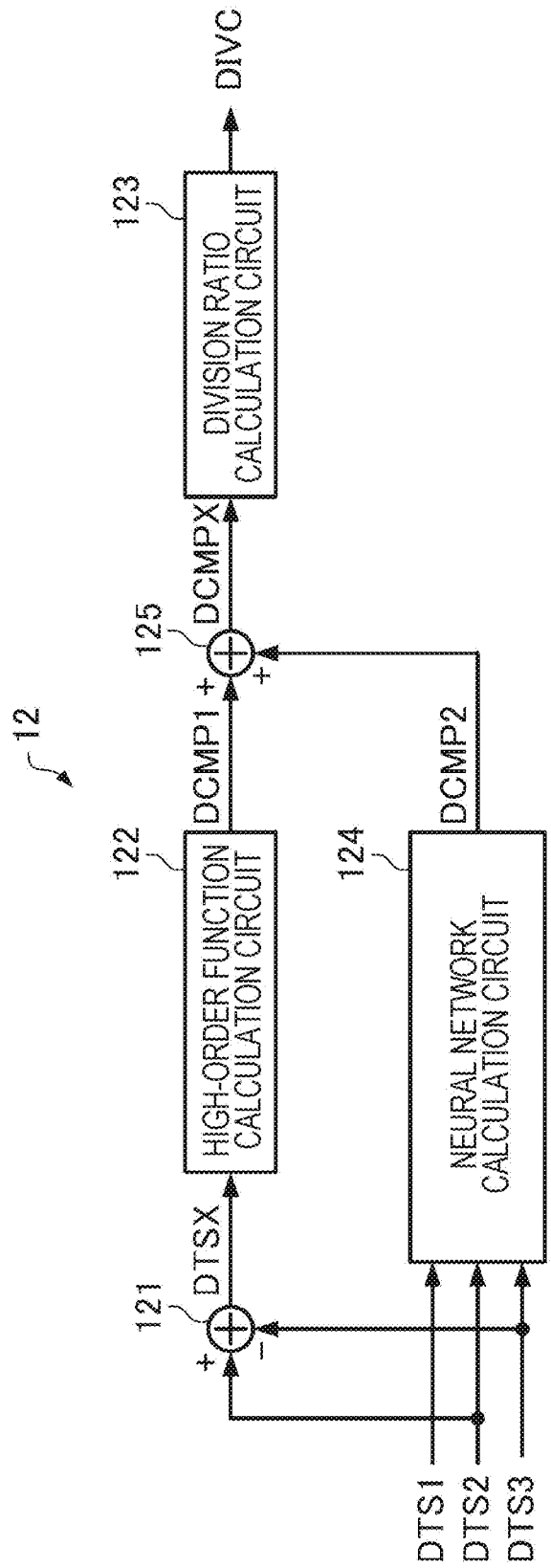
FIG. 21 is a diagram showing a configuration example of the temperature compensation circuit to realize the high-order function compensation and the neural network compensation.

The microcontroller 40 may perform, based on the temperature compensation program 132, the high-order function compensation and the neural network compensation as the temperature compensation of the oscillation signal OSCO. FIG. 21 is a diagram showing a configuration example of the temperature compensation circuit 12 to realize the high-order function compensation and the neural network compensation. In FIG. 21, the same reference numerals are assigned to the same components as those in FIG. 19 or FIG. 20. As shown in FIG. 21, the temperature compensation circuit 12 includes the subtractor 121, the high-order function calculation circuit 122, the division ratio calculation circuit 123, the neural network calculation circuit 124, and an adder 125. Since the subtractor 121, the high-order function calculation circuit 122, and the neural network calculation circuit 124 operate as described above, the description thereof will be omitted.

The adder 125 adds a temperature compensation code DCMP1 calculated by the high-order function calculation circuit 122 and a temperature compensation code DCMP2 calculated by the neural network calculation circuit 124 to output a temperature compensation code DCMPX.

The division ratio calculation circuit 123 calculates the division ratio of the fractional N-PLL circuit 45 based on the temperature compensation code DCMPX and performs the delta sigma modulation on the division ratio to generate the division ratio control signal DIVC. The fractional N-PLL circuit 45 performs the temperature compensation on the frequency of the oscillation signal OSCO, and thus the clock signal CK1 having high frequency accuracy is obtained.

In the case of the example of FIG. 21, the neural network included in the neural network calculation circuit 124 may have learned the weight and bias in the neural network calculation for obtaining the temperature compensation code DCMP2 from the temperature codes DTS1, DTS2, and DTS3, using a difference between actual measurement data of the temperature compensation code DCMPX and the temperature compensation code DCMP1 calculated by the high-order function calculation circuit 122 as the supervisor data.

2. Method of Manufacturing First Oscillator and Second Oscillator

As described above, in the oscillator 1 according to the present embodiment, with the change in the temperature control program 131, the normal control, the high-speed start control, or the maximum power suppression control is selectable as the temperature control by the microcontroller 40. Further, with the change in the temperature control program 131, whether or not to cause the microcontroller 40 to perform the set temperature correction control is selectable. Furthermore, with the change in the temperature compensation program 132, at least one of the high-order function compensation or the neural network compensation is selectable as the temperature compensation by the microcontroller 40. Therefore, two oscillators 1 having the same structure and different functions can be manufactured.

Figure 22:
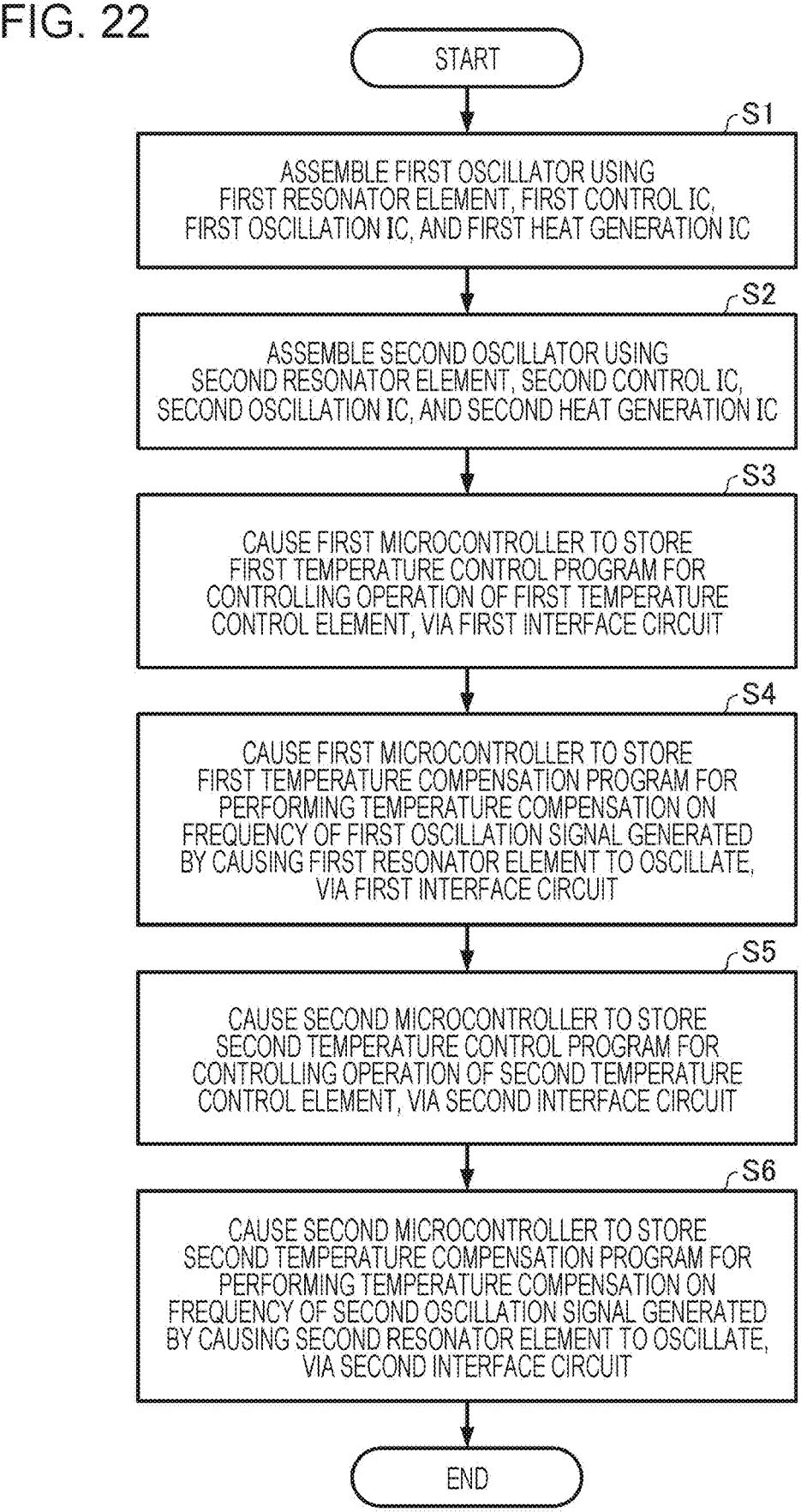
FIG. 22 is a diagram showing an example of a procedure of a method of manufacturing a first oscillator and a second oscillator.

FIG. 22 is a diagram showing an example of a procedure of a method of manufacturing a first oscillator and a second oscillator that are the oscillators 1 and have different functions from each other. For example, the procedure of FIG. 22 is executed by a manufacturing device (not illustrated).

In the example of FIG. 22, first, in step S1, the manufacturing device assembles a first oscillator that is the oscillator 1, using a first resonator element that is the resonator element 6, a first control IC that is the control IC 4, a first oscillation IC that is the oscillation IC 8, and a first heat generation IC that is the heat generation IC 7.

Next, in step S2, the manufacturing device assembles a second oscillator that is the oscillator 1, using a second resonator element that is the resonator element 6, a second control IC that is the control IC 4, a second oscillation IC that is the oscillation IC 8, and a second heat generation IC that is the heat generation IC 7.

With steps S1 and S2, the first oscillator and the second oscillator having the structure shown in FIGS. 1 to 4 are obtained.

Next, in step S3, the manufacturing device causes a first microcontroller to store a first temperature control program for controlling an operation of a first temperature control element via a first interface circuit. The first interface circuit is the interface circuit 49 included in the first control IC. Further, the first microcontroller is the microcontroller 40 included in the first control IC. Further, the first temperature control element is the temperature control element 71 included in the first heat generation IC. Further, the first temperature control program is the temperature control program 131 stored in the memory 13 of the first microcontroller.

The first temperature control program causes the first microcontroller to perform the normal control based on a value obtained by multiplying a difference between a first set temperature and a measured temperature measured by a first temperature sensor by a gain, and to perform, in a start period after the first temperature control element starts to operate, the maximum power suppression control in which power consumption by the first temperature control element is limited to a preset upper limit value or less. The first temperature sensor is the temperature sensor 82 included in the first oscillation IC or the temperature sensor 72 included in the first heat generation IC.

The first temperature control program may further cause the first microcontroller to perform the set temperature correction control of performing control such that the first set temperature is higher as a temperature measured by a third temperature sensor is lower. The third temperature sensor is the temperature sensor 42 included in the first control IC, and as described above, the distance between the first resonator element and the third temperature sensor is larger than the distance between the first resonator element and the first temperature sensor.

Next, in step S4, the manufacturing device causes the first microcontroller to store a first temperature compensation program for performing the temperature compensation on a frequency of a first oscillation signal generated by causing the first resonator element to oscillate, via the first interface circuit. The first oscillation signal is the oscillation signal OSCO output from the first oscillation IC. Further, the first temperature compensation program is the temperature compensation program 132 stored in the memory 13 of the first microcontroller. The first temperature compensation program causes the first microcontroller to perform at least one of the high-order function compensation using the polynomial equation of second-order or higher or the neural network compensation using the neural network.

Next, in step S5, the manufacturing device causes the second microcontroller to store the second temperature control program for controlling an operation of the second temperature control element, via the second interface circuit. The second interface circuit is the interface circuit 49 included in the second control IC. Further, the second microcontroller is the microcontroller 40 included in the second control IC. Further, the second temperature control element is the temperature control element 71 included in the second heat generation IC. Further, the second temperature control program is the temperature control program 131 stored in the memory 13 of the second microcontroller.

The second temperature control program causes the second microcontroller to perform the normal control based on a value obtained by multiplying a difference between a second set temperature and a measured temperature measured by a second temperature sensor by a gain, and to perform, in a start period after the second temperature control element starts to operate, the high-speed start control in which the gain to be multiplied to the difference between the second set temperature and the measured temperature measured by the second temperature sensor is switched from the first value k1 to the second value k2 smaller than the first value k1. The second temperature sensor is the temperature sensor 82 included in the second oscillation IC or the temperature sensor 72 included in the second heat generation IC.

The second temperature control program may further cause the second microcontroller to perform the set temperature correction control of performing control such that the second set temperature is higher as a temperature measured by a fourth temperature sensor is lower. The fourth temperature sensor is the temperature sensor 42 included in the second control IC, and as described above, the distance between the second resonator element and the fourth temperature sensor is larger than the distance between the second resonator element and the second temperature sensor.

Finally, in step S6, the manufacturing device causes the second microcontroller to store a second temperature compensation program for performing the temperature compensation on a frequency of a second oscillation signal generated by causing the second resonator element to oscillate, via the second interface circuit. The second oscillation signal is the oscillation signal OSCO output from the second oscillation IC. Further, the second temperature compensation program is the temperature compensation program 132 stored in the memory 13 of the second microcontroller. The second temperature compensation program causes the second microcontroller to perform at least one of the high-order function compensation using the polynomial equation of second-order or higher or the neural network compensation using the neural network.

As described above, in a manner of the procedure of FIG. 22, with the change in the temperature control program 131, two oscillators 1 having the same structures and different temperature control functions can be manufactured. Further, with the change in the temperature compensation program 132, two oscillators 1 having the same structures and different temperature compensation functions can be manufactured.

In FIG. 22, the order of steps S1 to S6 may be changed as appropriate. For example, the manufacturing device may perform steps S3 to S6 and then steps S1 and S2, may perform steps S1, S3, S4, S2, S5, and S6 in this order, or may perform steps S3, S4, S5, S6, S1, and S2 in this order.

3. Action and Effect

As described above, with the oscillator 1 according to the present embodiment, since the temperature control program 131 for the microcontroller 40 to control the temperature of the resonator element 6 is rewritable, the calculation of the temperature control of the resonator element 6 is easily optimized according to the application. For example, with the storing of the temperature control program 131 according to the application in the memory 13 of the microcontroller 40, the temperature control of the resonator element at the time of start is easily optimized for the maximum power suppression control or the high-speed start control. Further, for example, with the storing of the temperature control program 131 according to the application in the memory 13 of the microcontroller 40, the temperature control of the resonator element is easily optimized for the set temperature correction control.

Further, with the oscillator 1 according to the present embodiment, since the temperature compensation program 132 for the microcontroller 40 to perform the temperature compensation on the frequency of the oscillation signal OSCO is rewritable, the calculation of the temperature compensation is easily optimized according to the application. For example, with the storing of the temperature compensation program 132 according to the application in the memory 13 of the microcontroller 40, the temperature compensation is easily optimized for the high-order function compensation or the neural network compensation.

Further, with the manufacturing method of the present embodiment, the first temperature control program is written in the first microcontroller and the second temperature control program, which is different from the first temperature control program, is written in the second microcontroller, and thus, the first oscillator and the second oscillator having different calculations of the temperature control of the resonator elements while having the same configuration can be easily manufactured at low cost. For example, the first oscillator in which the temperature control of the resonator element 6 at the time of start is optimized for the maximum power suppression control and the second oscillator in which the temperature control of the resonator element 6 at the time of start is optimized for the high-speed start control can be easily manufactured at low cost. Further, for example, the first oscillator and the second oscillator in which the temperature control of the resonator element 6 is optimized for the temperature control of correcting the set temperature according to the outside air temperature can be easily manufactured at low cost.

Further, with the manufacturing method of the present embodiment, the first temperature compensation program is written in the first microcontroller and the second temperature compensation program is written in the second microcontroller, and thus, the first oscillator and the second oscillator in which the calculation of the temperature compensation is optimized can be easily manufactured at low cost. For example, the first oscillator and the second oscillator in which the temperature compensation is optimized for the high-order function compensation or the neural network compensation can be easily manufactured at low cost.

4. Modification Examples

The present disclosure is not limited to the present embodiment, and various modifications can be made within the scope of the spirit of the present disclosure.

Although the temperature control element 71 and the temperature sensor 72 are built in the heat generation IC 7 in the above embodiment, the temperature control element 71 may be provided separately from the temperature sensor 72. Further, although the temperature sensor 82 is built in the oscillation IC 8 in the above embodiment, the temperature sensor 82 may be provided separately from the oscillation IC 8. Further, although the temperature sensor 42 is built in the control IC 4 in the above embodiment, the temperature sensor 42 may be provided separately from the control IC 4. In these cases, for example, the temperature sensors 72, 82, and 42 may be thermistors or platinum resistors.

Further, the control IC 4 includes one temperature sensor 42 in the above embodiment, but may include a plurality of temperature sensors. In this case, for example, the A/D converter 43 may convert a plurality of temperature measurement signals output from the plurality of temperature sensors into a plurality of temperature codes, and the microcontroller 40 may perform the temperature control or the temperature compensation based on the plurality of temperature codes. For example, the microcontroller 40 may perform the temperature control or the temperature compensation using an average value of the plurality of temperature codes as the temperature code DTS3.

Further, in the above embodiment, the temperature compensation is performed by controlling the division ratio of the fractional N-PLL circuit 45 based on the division ratio control signal DIVC output by the microcontroller 40. However, the temperature compensation method is not limited thereto. For example, the oscillation circuit 81 built in the oscillation IC 8 may have a capacitance array, and a capacitance value of the capacitance array may be selected based on the temperature compensation code DCMP calculated by the microcontroller 40 to perform the temperature compensation. Further, for example, the oscillation circuit 81 may have a variable capacitive element for frequency adjustment, a D/A converter may convert the temperature compensation code DCMP calculated by the microcontroller 40 into an analog signal, and a capacitance value of the variable capacitive element may be controlled based on the analog signal to perform the temperature compensation.

Further, in the above embodiment, one A/D converter 43 converts the temperature measurement signals TS1, TS2, and TS3 respectively into the temperature codes DTS1, DTS2, and DTS3 in a time-division manner. However, for example, the control IC 4 may include a plurality of A/D converters, and the plurality of A/D converters may convert the temperature measurement signals TS1, TS2, and TS3 respectively into the temperature codes DTS1, DTS2, and DTS3.

Further, in the above embodiment, the temperature control element 71 is the heat generation element such as a CMOS transistor. However, the temperature control element 71 may be an element configured to control the temperature of the resonator element 6, and may be a heat absorbing element such as a Peltier element depending on a relationship between the target set temperature of the resonator element 6 and the outside air temperature.

The above-described embodiments and modification examples are merely examples, and the present disclosure is not limited thereto. For example, each embodiment and each modification example can be combined as appropriate.

The present disclosure includes a configuration substantially the same as the configuration described in the embodiment, for example, a configuration having the same function, method, and result, or a configuration having the same purpose and effect. The present disclosure also includes a configuration in which a non-essential part of the configuration described in the embodiment is replaced. Further, the present disclosure includes a configuration that exhibits the same effects as the configuration described in the embodiment or a configuration that can achieve the same object. Further, the present disclosure includes a configuration in which a known technique is added to the configuration described in the embodiment.

The following contents are derived from the above-described embodiment and modification example.

According to an aspect of the present disclosure, there is provided an oscillator including
a resonator element,
a temperature control element that controls a temperature of the resonator element,
a microcontroller that stores a temperature control program and controls an operation of the temperature control element based on the temperature control program, and
an interface circuit, in which
the temperature control program is rewritable via the interface circuit.

With the oscillator, since the temperature control program for the microcontroller to control the temperature of the resonator element is rewritable, the calculation of the temperature control of the resonator element is easily optimized according to the application.

According to an aspect of the present disclosure, the oscillator further includes
a first temperature sensor, in which
the microcontroller may perform,
based on the temperature control program,
control based on a value obtained by multiplying a difference between a set temperature and a measured temperature measured by the first temperature sensor by a gain, and
may perform, in a start period after the temperature control element starts to operate, any one of
maximum power suppression control in which power consumption by the temperature control element is limited to a preset upper limit value or less, or
high-speed start control in which the gain is switched from a first value to a second value smaller than the first value.

With the oscillator, the temperature control of the resonator element at the time of start is easily optimized, according to the application, for the maximum power suppression control or the high-speed start control.

According to an aspect of the present disclosure, the oscillator further includes
a second temperature sensor, in which
a distance between the resonator element and the second temperature sensor is larger than a distance between the resonator element and the first temperature sensor, and
the microcontroller may perform,
based on the temperature control program, control such that the set temperature is higher as a temperature measured by the second temperature sensor is lower.

With the oscillator, the temperature control of the resonator element is easily optimized, according to the application, for the temperature control of correcting the set temperature according to the outside air temperature.

According to an aspect of the present disclosure, in the oscillator,
the microcontroller may further store a temperature compensation program and may perform temperature compensation on a frequency of an oscillation signal generated by causing the resonator element to oscillate based on the temperature compensation program, and
the temperature compensation program may be rewritable via the interface circuit.

With the oscillator, since the temperature compensation program for the microcontroller to perform the temperature compensation on the frequency of the oscillation signal is rewritable, the calculation of the temperature compensation is easily optimized according to the application.

According to an aspect of the present disclosure, in the oscillator,
the microcontroller may perform at least one of high-order function compensation using a polynomial equation of second-order or higher or neural network compensation using a neural network, based on the temperature compensation program.

With the oscillator, the temperature compensation is easily optimized, according to the application, for the high-order function compensation or the neural network compensation.

According to an aspect of the present disclosure, there is provided a method of manufacturing a first oscillator and a second oscillator, in which
the first oscillator includes a first resonator element, a first temperature control element that controls a temperature of the first resonator element, a first microcontroller, and a first interface circuit, and
the second oscillator includes a second resonator element, a second temperature control element that controls a temperature of the second resonator element, a second microcontroller, and a second interface circuit, the method including causing the first microcontroller to store a first temperature control program for controlling an operation of the first temperature control element via the first interface circuit, and causing the second microcontroller to store a second temperature control program, which is different from the first temperature control program, for controlling an operation of the second temperature control element via the second interface circuit.

With the manufacturing method, the first temperature control program is written in the first microcontroller and the second temperature control program, which is different from the first temperature control program, is written in the second microcontroller, and thus, the first oscillator and the second oscillator having different calculations of the temperature control of the resonator elements while having the same configuration can be easily manufactured at low cost.

According to an aspect of the present disclosure, in the method of manufacturing a first oscillator and a second oscillator, the first oscillator further includes a first temperature sensor, the second oscillator further includes a second temperature sensor, the first temperature control program may cause the first microcontroller to perform control based on a value obtained by multiplying a difference between a first set temperature and a measured temperature measured by the first temperature sensor by a gain, and perform, in a start period after the first temperature control element starts to operate, maximum power suppression control in which power consumption by the first temperature control element is limited to a preset upper limit value or less, and the second temperature control program may cause the second microcontroller to perform control based on a value obtained by multiplying a difference between a second set temperature and a measured temperature measured by the second temperature sensor by a gain, and perform, in a start period after the second temperature control element starts to operate, high-speed start control in which the gain to be multiplied to the difference between the second set temperature and the measured temperature measured by the second temperature sensor is switched from a first value to a second value smaller than the first value.

With the manufacturing method, the first oscillator in which the temperature control of the resonator element at the time of start is optimized for the maximum power suppression control and the second oscillator in which the temperature control of the resonator element at the time of start is optimized for high-speed start control can be easily manufactured at low cost.

According to an aspect of the present disclosure, in the method of manufacturing a first oscillator and a second oscillator, the first oscillator further includes a third temperature sensor, a distance between the first resonator element and the third temperature sensor is larger than a distance between the first resonator element and the first temperature sensor, and the first temperature control program may cause the first microcontroller to perform control such that the first set temperature is higher as a temperature measured by the third temperature sensor is lower.

With the manufacturing method, the first oscillator in which the temperature control of the resonator element is optimized for the temperature control of correcting the set temperature according to the outside air temperature can be easily manufactured at low cost.

According to an aspect of the present disclosure, in the method of manufacturing a first oscillator and a second oscillator, the second oscillator further includes a fourth temperature sensor, a distance between the second resonator element and the fourth temperature sensor is larger than a distance between the second resonator element and the second temperature sensor, and the second temperature control program may cause the second microcontroller to perform control such that the second set temperature is higher as a temperature measured by the fourth temperature sensor is lower.

With the manufacturing method, the second oscillator in which the temperature control of the resonator element is optimized for the temperature control of correcting the set temperature according to the outside air temperature can be easily manufactured at low cost.

According to an aspect of the present disclosure, the method of manufacturing a first oscillator and a second oscillator may further include causing the first microcontroller to store a first temperature compensation program for performing temperature compensation on a frequency of a first oscillation signal generated by causing the first resonator element to oscillate via the first interface circuit.

With the manufacturing method, the first temperature compensation program is written in the first microcontroller, and thus, the first oscillator in which the calculation of the temperature compensation is optimized can be easily manufactured at low cost.

According to an aspect of the present disclosure, in the method of manufacturing a first oscillator and a second oscillator, the first temperature compensation program may cause the first microcontroller to perform at least one of high-order function compensation using a polynomial equation of second-order or higher or neural network compensation using a neural network.

With the manufacturing method, the first oscillator in which the temperature compensation is optimized for the high-order function compensation or the neural network compensation can be easily manufactured at low cost.

According to an aspect of the present disclosure, the method of manufacturing a first oscillator and a second oscillator may further include causing the second microcontroller to store a second temperature compensation program for performing temperature compensation on a frequency of a second oscillation signal generated by causing the second resonator element to oscillate via the second interface circuit.

With the manufacturing method, the second temperature compensation program is written in the second microcontroller, and thus, the second oscillator in which both the calculation of the temperature control and the calculation of the temperature compensation are optimized can be easily manufactured at low cost.

According to an aspect of the present disclosure, in the method of manufacturing a first oscillator and a second oscillator, the second temperature compensation program may cause the second microcontroller to perform
at least one of high-order function compensation using a polynomial equation of second-order or higher or neural network compensation using a neural network.

With the manufacturing method, the second oscillator in which the temperature compensation is optimized for the high-order function compensation or the neural network compensation can be easily manufactured at low cost.

What is claimed is:

1. An oscillator comprising:
a resonator element;
a temperature control element that controls a temperature of the resonator element;
a microcontroller that stores a temperature control program and controls an operation of the temperature control element based on the temperature control program;
an interface circuit; and
a first temperature sensor, wherein
the temperature control program is rewritable via the interface circuit,
the microcontroller performs, based on the temperature control program, control based on a value obtained by multiplying a difference between a set temperature and a measured temperature measured by the first temperature sensor by a gain, and performs, in a start period after the temperature control element starts to operate, any one of
maximum power suppression control in which power consumption by the temperature control element is limited to a preset upper limit value or less, or
high-speed start control in which the gain is switched from a first value to a second value smaller than the first value.

2. The oscillator according to claim 1, further comprising:
a second temperature sensor, wherein
a distance between the resonator element and the second temperature sensor is larger than a distance between the resonator element and the first temperature sensor, and
the microcontroller performs, based on the temperature control program, control such that the set temperature is higher as a temperature measured by the second temperature sensor is lower.

3. A method of manufacturing a first oscillator and a second oscillator, wherein
the first oscillator includes a first resonator element, a first temperature control element that controls a temperature of the first resonator element, a first microcontroller, and a first interface circuit, and
the second oscillator includes a second resonator element, a second temperature control element that controls a temperature of the second resonator element, a second microcontroller, and a second interface circuit, the method comprising:
causing the first microcontroller to store a first temperature control program for controlling an operation of the first temperature control element via the first interface circuit; and
causing the second microcontroller to store a second temperature control program, which is different from the first temperature control program, for controlling an operation of the second temperature control element via the second interface circuit.

4. The method according to claim 3, wherein
the first oscillator further includes a first temperature sensor,
the second oscillator further includes a second temperature sensor,
the first temperature control program causes the first microcontroller to perform control based on a value obtained by multiplying a difference between a first set temperature and a measured temperature measured by the first temperature sensor by a gain, and perform, in a start period after the first temperature control element starts to operate, maximum power suppression control in which power consumption by the first temperature control element is limited to a preset upper limit value or less, and
the second temperature control program causes the second microcontroller to perform control based on a value obtained by multiplying a difference between a second set temperature and a measured temperature measured by the second temperature sensor by a gain, and perform, in a start period after the second temperature control element starts to operate, high-speed start control in which the gain to be multiplied to the difference between the second set temperature and the measured temperature measured by the second temperature sensor is switched from a first value to a second value smaller than the first value.

5. The method according to claim 4, wherein
the first oscillator further includes a third temperature sensor,
a distance between the first resonator element and the third temperature sensor is larger than a distance between the first resonator element and the first temperature sensor, and
the first temperature control program causes the first microcontroller to perform control such that the first set temperature is higher as a temperature measured by the third temperature sensor is lower.

6. The method according to claim 4, wherein
the second oscillator further includes a fourth temperature sensor,
a distance between the second resonator element and the fourth temperature sensor is larger than a distance between the second resonator element and the second temperature sensor, and
the second temperature control program causes the second microcontroller to perform control such that the second set temperature is higher as a temperature measured by the fourth temperature sensor is lower.

7. The method according to claim 3, further comprising:
causing the first microcontroller to store a first temperature compensation program for performing temperature compensation on a frequency of a first oscillation signal generated by causing the first resonator element to oscillate via the first interface circuit.

8. The method according to claim 7, wherein
the first temperature compensation program causes the first microcontroller to perform at least one of high-order function compensation using a polynomial equation of second-order or higher or neural network compensation using a neural network.

9. The method according to claim 3, further comprising:
causing the second microcontroller to store a second temperature compensation program for performing temperature compensation on a frequency of a second oscillation signal generated by causing the second resonator element to oscillate via the second interface circuit.

10. The method according to claim 9, wherein
the second temperature compensation program causes the second microcontroller to perform at least one of high-order function compensation using a polynomial equation of second-order or higher or neural network compensation using a neural network.

11. The oscillator according to claim 1, wherein
the microcontroller further stores a temperature compensation program and performs temperature compensation on a frequency of an oscillation signal generated by causing the resonator element to oscillate based on the temperature compensation program, and
the temperature compensation program is rewritable via the interface circuit.

12. The oscillator according to claim 11, wherein
the microcontroller performs at least one of high-order function compensation using a polynomial equation of second-order or higher or neural network compensation using a neural network, based on the temperature compensation program.

* * * * *